United States Patent
Wang et al.

(10) Patent No.: US 10,411,474 B2
(45) Date of Patent: Sep. 10, 2019

(54) ELECTRIC POWER SYSTEM AND CONTROL METHOD THEREOF

(71) Applicant: DELTA ELECTRONICS (SHANGHAI) CO., LTD., Shanghai (CN)

(72) Inventors: Changyong Wang, Shanghai (CN); Fei Lu, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 176 days.

(21) Appl. No.: 15/410,207

(22) Filed: Jan. 19, 2017

(65) Prior Publication Data
US 2017/0250538 A1  Aug. 31, 2017

(30) Foreign Application Priority Data
Feb. 25, 2016 (CN) .......................... 2016 1 0104988

(51) Int. Cl.
*H02J 7/00* (2006.01)
*H02J 3/38* (2006.01)
(Continued)

(52) U.S. Cl.
CPC ............ *H02J 3/383* (2013.01); *H02J 7/0068* (2013.01); *H02M 3/158* (2013.01);
(Continued)

(58) Field of Classification Search
CPC .. H02J 7/0068; H02J 7/007; H02J 7/14; H02J 7/1469
(Continued)

(56) References Cited

U.S. PATENT DOCUMENTS 5,285,029 A * 2/1994 Araki ..................... B66B 5/027
187/290
5,629,870 A * 5/1997 Farag .................. G01R 31/343
324/558
(Continued)

FOREIGN PATENT DOCUMENTS

CN         1691464 A    11/2005
CN       102112383 A     6/2011
(Continued)

*Primary Examiner* — Adi Amrany
(74) *Attorney, Agent, or Firm* — Kirton McConkie; Evan R. Witt

(57) ABSTRACT

An electric power system includes a variable-frequency drive and a control module. The variable-frequency drive includes a first power converter, a second power converter and at least one energy storage module. The first power converter is connected between a DC bus and a power terminal. Moreover, electric energy is transferred between the first power converter and the power terminal at a first power. The second power converter is connected between the DC bus and an electric/kinetic energy conversion device. Moreover, electric energy is transferred between the second power converter and the electric/kinetic energy conversion device at a second power. As the second power is dynamically changed, the control module controls a charge/discharge operation of the at least one energy storage module. As a consequence, the operational change of the electric/kinetic energy conversion device is reversely compensated.

21 Claims, 15 Drawing Sheets

(51) Int. Cl.
*H02M 3/158* (2006.01)
*H02M 7/217* (2006.01)
*H02M 7/537* (2006.01)
*H02M 5/458* (2006.01)
*H02P 7/00* (2016.01)
*H02P 27/08* (2006.01)

(52) U.S. Cl.
CPC ......... *H02M 5/4585* (2013.01); *H02M 7/217* (2013.01); *H02M 7/537* (2013.01); *H02P 7/00* (2013.01); *H02P 27/08* (2013.01)

(58) Field of Classification Search
USPC ........................................ 307/44–46, 64, 66
See application file for complete search history.

(56) References Cited

U.S. PATENT DOCUMENTS

| | | | | |
|---|---|---|---|---|
| 6,315,081 | B1* | 11/2001 | Yeo | B66B 5/02 187/290 |
| 6,460,658 | B2* | 10/2002 | Suga | B66B 1/30 187/290 |
| 6,742,630 | B2* | 6/2004 | Eilinger | B66B 1/30 187/290 |
| 6,827,182 | B2* | 12/2004 | Araki | B66B 5/027 187/290 |
| 6,938,733 | B2* | 9/2005 | Eilinger | B66B 5/02 187/290 |
| 9,381,990 | B2* | 7/2016 | Settemsdal | B60L 7/14 |
| 2001/0013447 | A1* | 8/2001 | Araki | B66B 1/30 187/296 |
| 2001/0017239 | A1* | 8/2001 | Tajima | B66B 1/30 187/290 |
| 2012/0010751 | A1* | 1/2012 | Kallioniemi | B66B 1/302 700/275 |
| 2013/0307444 | A1* | 11/2013 | Settemsdal | B60L 7/14 318/139 |
| 2016/0226423 | A1* | 8/2016 | Watabu | H02P 27/06 |
| 2017/0149369 | A1* | 5/2017 | Watabu | H02P 27/06 |

FOREIGN PATENT DOCUMENTS

| | | |
|---|---|---|
| CN | 103329396 A | 9/2013 |
| CN | 104836248 A | 8/2015 |
| KR | 101322617 B1 | 10/2013 |
| TW | M513842 U | 12/2015 |
| WO | 2015049746 A1 | 4/2015 |

* cited by examiner

ELECTRIC POWER SYSTEM AND CONTROL METHOD THEREOF

FIELD OF THE INVENTION

The present invention relates to an electric power system and a control method thereof, and more particularly to an electric power system and a control method capable of reducing the influence of the operational change of an electric/kinetic energy conversion device on the input/output power of a power terminal.

BACKGROUND OF THE INVENTION

Since all electronic devices require electric energy to maintain the working state, an electric power system is provided to convert the received electric energy into regulated voltages for these electronic devices. As known, it is important to stabilize the electric power system. For example, since the electric power system in the ship is somewhat different from the electric power system on the shore, the demands on the reliability and stability of the electric power system in the ship industry are more stringent. Particularly, when the electric motor of the ship is in an acceleration stage or the sea condition is worse, the loading of the electric motor is increased and thus the required power of the electric motor is increased. If the performance of the electric power system is poor, the electric power system cannot make an immediate response. Under this circumstance, the propulsive power of the electric motor is insufficient. Moreover, since the DC bus voltage of a variable-frequency drive in the electric power system is decreased and the operation of the electric motor is unstable, the propulsive performance is deteriorated. Whereas, when the electric motor is in a deceleration stage and the electric motor is in a power generation mode, the propulsive power is quickly decreased. Under this circumstance, a portion of the electric energy is fed back from the electric motor to the DC bus of the variable-frequency drive of the electric power system. Since the bus voltage of the DC bus is abruptly increased, the electronic components of the electric power system are possibly damaged.

Conventionally, some approaches are provided to solving the problems about the abruptly increased demand of the propulsive power. For example, the output power of the electric power system is increased or a backup power generator is additionally equipped to assure the utilization flexibility. However, as the output power of the electric power system is increased, the thermal power generated by the electric motor also increases. Under this circumstance, the operating efficiency of the electric power system is decreased and the fabricating cost is increased. Moreover, because of the working characteristics of the power generator, the power generator cannot make an immediate response to the abruptly increased demand of the propulsive power. In other words, the installation of the backup power generator cannot comply with the requirement of utilization flexibility.

Similarly, some approaches are provided to solving the problems about the abruptly decreased demand of the propulsive power. For example, the electric power system is equipped with an additional bleeder resistor to consume the excess electric energy, or the excess electric energy is recycled to a power grid. These approaches have restrictions. In case that the bleeder resistor is used, the size, weight and heat-dissipating efficiency of the bleeder resistor have to be taken into consideration and the operating efficiency of the electric power system is adversely affected by the energy consumption. Moreover, since the capacity of the power grid integrated the electric power system is usually very low, the excess electric energy recycled to the power grid may influence the stability of the power grid.

Moreover, for reducing the pollution to ports in some areas, ships that pull in to a shore or harbor are permitted to use light oil as the source of the power generator or use the shore power to guide the ship to dock. However, the use of the light oil or the shore power increases the operating cost of the ship.

Therefore, there is a need of providing an electric power system and a control method in order to overcome the above drawbacks.

SUMMARY OF THE INVENTION

The electric power system includes an energy storage module. In response to an operational change of an electric/kinetic energy conversion device, a charge/discharge operation of the energy storage module is performed. Consequently, the operational change of the electric/kinetic energy conversion device is compensated, and the influence of the operational change of the electric/kinetic energy conversion device on a first power between a first power converter of the variable-frequency drive and a power terminal is reduced. That is, when the operational change of the electric/kinetic energy conversion device occurs, the DC bus voltage and the first power are stabilized. By the electric power system of the present invention, the smooth control of the first power is realized, the fabricating cost is reduced, the DC bus voltage of the variable-frequency drive is stabilized, and the influence of the external factor on the power grid is reduced. Especially when the electric power system of the present invention is used in a ship, many benefits are achieved. For example, the thermal power generated by the electric motor is decreased, the size, weight and heat-dissipating efficiency of the bleeder resistor are optimized, the operating efficiency of the electric power system is enhanced, and the electric power system is environmentally friendly to the ports.

In accordance with an aspect of the present invention, there is provided an electric power system. The electric power system is used for converting and transferring electric energy between an electric/kinetic energy conversion device and a power terminal. The electric power system includes a variable-frequency drive and a control module. The variable-frequency drive includes a first power converter, a second power converter and at least one energy storage module. The first power converter is connected between a DC bus and the power terminal. Moreover, electric energy is transferred between the first power converter and the power terminal at a first power. The second power converter is connected between the DC bus and the electric/kinetic energy conversion device. Moreover, electric energy is transferred between the second power converter and the electric/kinetic energy conversion device at a second power. The second power is dynamically changed in response to an operational change of the electric/kinetic energy conversion device. The energy storage module is connected with the DC bus. The control module is connected with the variable-frequency drive and the electric/kinetic energy conversion device. As the second power is dynamically changed, the control module controls a charge/discharge operation of the at least one energy storage module. Consequently, the operational change of the electric/kinetic energy conversion device is compensated, and an influence of the operational change of the electric/kinetic energy conversion device on the first power is reduced.

In accordance with another aspect of the present invention, there is provided an electric power system for driving an inductive load. The electric power system being is connected with a DC generating system. The electric power system includes a variable-frequency drive and a control module. The variable-frequency drive is used for converting electric energy in a bidirectional manner. The variable-frequency drive includes an inverter circuit and at least one energy storage module. The inverter circuit receives a DC voltage and converts the DC voltage into AC output energy. The AC output energy is outputted to the inductive load. The at least one energy storage module is connected with the inverter circuit. The control module is connected with the variable-frequency drive and the inductive load. According to a dynamic loading change of the inductive load, the control module controls a charge/discharge operation of the at least one energy storage module so as to compensate the dynamic loading change of the inductive load and reduce an influence of the dynamic loading change of the inductive load on an input power of the variable-frequency drive.

In accordance with a further aspect of the present invention, there is provided a control method of an electric power system. The electric power system is connected between an electric/kinetic energy conversion device and a power terminal. The electric power system includes a variable-frequency drive and a control module. The control module controls a charge/discharge operation of an energy storage module of the variable-frequency drive. Moreover, electric energy being transferred between the electric power system and the power terminal at a first power, and electric energy being transferred between the electric power system and the electric/kinetic energy conversion device at a second power. The second power is dynamically changed in response to an operational change of the electric/kinetic energy conversion device. The control method includes the following steps. Firstly, the second power is calculated according to plural parameters of the variable-frequency drive, and a spectral decomposition is performed on the second power to acquire a spectral sequence of the second power. After the spectral sequence is filtered, a compensated power in a specified frequency range is acquired. Then, the control module uses the compensated power to control a charge/discharge operation of the energy storage module according to a dynamic change of the second power. Consequently, the operational change of the electric/kinetic energy conversion device is compensated, and the influence of the operational change of the electric/kinetic energy conversion device on the first power is reduced.

The above contents of the present invention will become more readily apparent to those ordinarily skilled in the art after reviewing the following detailed description and accompanying drawings, in which:

DETAILED DESCRIPTION OF THE PREFERRED EMBODIMENT

Figure 1:
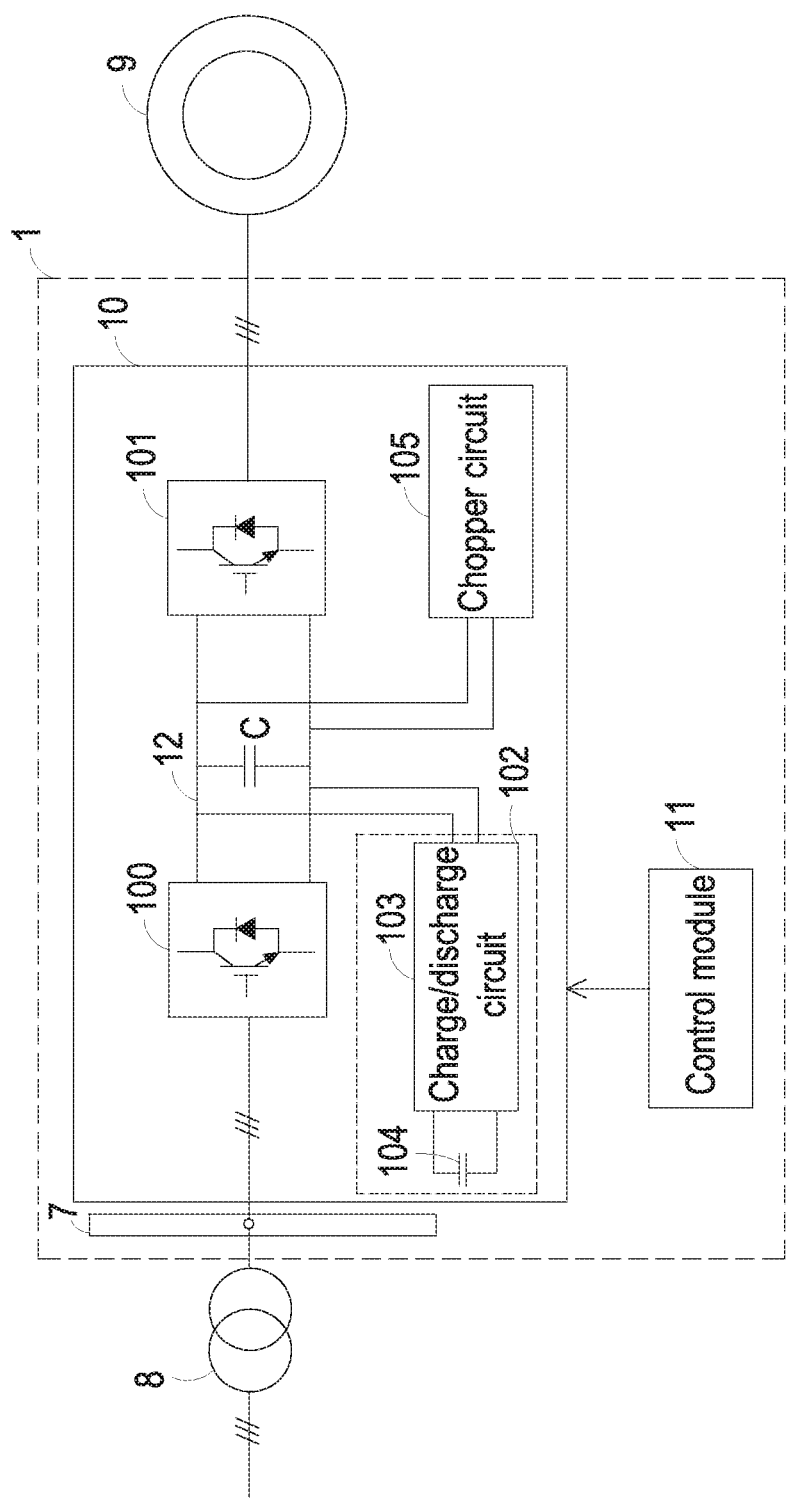
FIG. 1 is a schematic circuit block diagram illustrating an electric power system for a ship according to a first embodiment of the present invention.

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown. For well understanding the present invention, the elements shown in the drawings are not in scale with the elements of the practical product.

The present invention provides an electric power system. The electric power system is connected between an electric/kinetic energy conversion device and a power terminal. The electric power system is configured to transfer electric energy between the electric/kinetic energy conversion device and the power terminal. Moreover, the electric power system can be applied to a ship, a photovoltaic (solar) power generation apparatus or a wind power generation apparatus. In case that the electric power system is applied to a ship, the electric/kinetic energy conversion device is an inductive load (e.g., an electric motor), and the power terminal is a power generator. In case that the electric power system is applied to a photovoltaic power generation apparatus, the electric power system is a solar power system, the electric/kinetic energy conversion device is a photovoltaic power generator, and the power terminal is a power grid. In case that the electric power system is applied to a wind power generation apparatus, the electric power system is a wind power generating system, the electric/kinetic energy conversion device is a wind power generator, and the power terminal is a power grid.

The electric power system comprises a variable-frequency drive and a control module. The variable-frequency drive comprises a first power converter, a second power converter and at least one energy storage module. The first power converter is connected between a DC bus and the power terminal. Moreover, electric energy is transferred between the first power converter and the power terminal at a first power. The second power converter is connected between the DC bus and the electric/kinetic energy conversion device. Moreover, electric energy is transferred between the second power converter and the electric/kinetic energy conversion device at a second power. The second power is dynamically changed in response to an operational change of the electric/kinetic energy conversion device. The energy storage module is connected with the DC bus. The control module is connected with the variable-frequency drive and the electric/kinetic energy conversion device. As the second power is dynamically changed, the control module controls a charge/discharge operation of the energy storage module. Consequently, the operational change of the electric/kinetic energy conversion device is compensated, and an influence of the operational change of the electric/kinetic energy conversion device on the first power is reduced.

As mentioned above, the electric power system can be applied to a ship, a photovoltaic power generation apparatus or a wind power generation apparatus. The operations of electric energy transmission are somewhat different. First of all, the application of the electric power system on the ship will be illustrated in more details as follows.

FIG. 1 is a schematic circuit block diagram illustrating an electric power system for a ship according to a first embodiment of the present invention. The electric power system 1 is used for driving an inductive load in a ship. For example, the inductive load is an electric motor 9. As shown in FIG. 1, the electric power system 1 comprises a variable-frequency drive 10 and a control module 11. The variable-frequency drive 10 is connected between a power generator 8 and the electric motor 9. When the electric motor 9 is in an electric motor mode, the variable-frequency drive 10 receives a first power from the power generator 8 (i.e., an input power) and converts the input power into a second power. The second power is provided to the electric motor 9 in order to drive the operation of the electric motor 9. On the other hand, when the electric motor 9 is in a power generation mode, the variable-frequency drive 10 selectively converts the electric energy that is generated by the electric motor 9. The converted electric energy is fed back to the power generator 8. In other words, the function of bi-directional power conversion can be achieved by the variable-frequency drive 10.

An example of the power generator 8 includes but is not limited to a three-phase AC power generator. In addition, the power generator 8 is driven by an internal combustion engine or a diesel engine in the ship.

In this embodiment, the variable-frequency drive 10 comprises a DC bus 12, a first power converter 100, a second power converter 101 and at least one energy storage module 102. For example, the first power converter 100 is a rectifier circuit. Moreover, since the variable-frequency drive 10 has the function of bi-directional power conversion, the first power converter 100 is an active rectifier circuit. The first power converter 100 is connected between the DC bus 12 and the power generator 8. After the input power from the power generator 8 is received by the first power converter 100, the AC input energy corresponding to the input power is rectified by the first power converter 100. Consequently, DC energy is outputted from the first power converter 100 to the DC bus 12. The second power converter 101 is connected between the DC bus 12 and the electric motor 9 in order to covert electric energy. In this embodiment, the second power converter 100 is an inverter circuit, and the DC energy from the DC bus 12 is converted into AC output energy corresponding to the second power (i.e., the output power of the variable-frequency drive 10) by the second power converter 101. The AC output energy is outputted to the electric motor 9. Moreover, the second power is dynamically changed in response to an operational change of the electric motor 9. The energy storage module 102 is connected with the DC bus 12. The energy storage module 102 is used for charging or discharging electricity.

The control module 11 is connected with the variable-frequency drive 10 and the electric motor 9. The control module 11 controls operations of the variable-frequency drive 10 according to associated parameters of the variable-frequency drive 10. Moreover, as the second power is dynamically changed, the control module 11 controls a charge/discharge operation of the energy storage module 102 so as to compensate the operational change of the electric motor 9 and reduce an influence of the operational change of the electric motor 9 on the input power of the variable-frequency drive 10.

In this embodiment, the variable-frequency drive 10 further comprises a bus capacitor C. The bus capacitor C is connected between the first power converter 100 and the second power converter 101, and connected with the DC bus 12. The bus capacitor C is used for achieving voltage stabilization. The energy storage module 102 comprises a charge/discharge circuit 103 and an energy storage element 104. The charge/discharge circuit 103 is connected with the energy storage element 104 and the control module 11. Under control of the control module 11, the charge/discharge circuit 103 selectively charges electric energy into the energy storage element 104 or discharges electric energy from the energy storage element 104. An example of the energy storage element 104 includes but is not limited to a chargeable battery (e.g., a lead-acid battery or a lithium battery) or an ultracapacitor.

In this embodiment, the variable-frequency drive 10 further comprises a chopper circuit 105. The chopper circuit 105 is connected with the DC bus 12 and controlled by the control module 11. When the DC bus 12 has excess electric energy, for example, the electric motor 9 is in a power generation mode to discharge electricity, the bus voltage of the DC bus 12 increases. Once the bus voltage of the DC bus 12 reaches an enable threshold, the chopper circuit 105 is enabled under control of the control module 11. Consequently, the excess electric energy of the DC bus 12 is consumed.

The electric power system 1 further comprises a distribution board 7. In case that the power generator 8 is a three-phase AC power generator, the distribution board 7 is an AC distribution board. The distribution board 7 is connected between the power generator 8 and the variable-frequency drive 10. The AC input energy provided by the power generator 8 is distributed by the distribution board 7.

The operation mode of the electric power system 1 is determined according to the operational change of the electric motor 9.

When the electric power system 1 is in a first mode (Mode 1), the electric motor 9 is operated at a uniform speed and in an electric motor mode. Under this circumstance, the required power of the electric motor 9 is lower than the received input power of the electric power system 1. A greater portion of the electric energy from the power generator 8 is converted by the first power converter 100 and the second power converter 101, and the converted electric energy is transmitted to the electric motor 9. Moreover, a smaller portion of the electric energy from the power generator 8 is converted by the first power converter 100, and the converted electric energy is transmitted to the charge/discharge circuit 103. The converted electric energy is processed into charged energy so as to charge the energy storage element 104. Meanwhile, the energy storage element 104 is in a floating charge status, and thus the activity of the energy storage element 104 is maintained.

When the electric power system 1 is in a second mode (Mode 2), the electric motor 9 is operated in a normal acceleration or deceleration stage. Under this circumstance, the electric energy from the power generator 8 is converted by the first power converter 100 and the second power converter 101, and the converted electric energy is transmitted to the electric motor 9. According to the operational change of the electric motor 9, the control module 11 controls a charge/discharge operation of the energy storage module 102 so as to compensate the operational change of the electric motor 9 and reduce an influence of the operational change of the electric motor 9 on the received input power of the variable-frequency drive 10. Consequently, the received input power of the variable-frequency drive 10 is kept stable. That is, when the operational change of the electric motor 9 occurs, the voltage at the DC bus 12 and the received input power of the variable-frequency drive 10 are stabilized. Moreover, when the electric motor 9 is operated in the acceleration stage and in the electric motor mode, the required power of the electric motor 9 is higher than the received input power of the electric power system 1. Meanwhile, the control module 11 controls the energy storage module 102 to discharge electricity. The stored electric energy in the energy storage element 104 is processed by the charge/discharge circuit 103 and transferred to the electric motor 9. Consequently, the difference between the required power of the electric motor 9 and the input power is compensated. Whereas, when the electric motor 9 is operated in the deceleration stage and in the power generation mode, the control module 11 controls a charge/discharge operation of the energy storage module 102. Meanwhile, the electric energy released from the electric motor 9 to the DC bus 12 is converted by the charge/discharge circuit 103 so as to charge the energy storage element 104. Consequently, the voltage of the DC bus 12 is kept stable.

When the electric power system 1 is in a third mode (Mode 3), the ship is only powered by the energy storage element 104 and the power generator 8 is disabled. For example, in case that the ship pulls in to a shore or harbors by attitude adjustment, the power generator 8 is disabled. Under this circumstance, the first power converter 100 is disabled. Moreover, the control module 11 controls the energy storage module 102 to discharge electricity. The stored electric energy in the energy storage element 104 is processed by the charge/discharge circuit 103 and the second power converter 101 and transferred to the electric motor 9. Consequently, the voltage of the DC bus 12 is kept stable, and the electric motor 9 is temporarily powered by the energy storage module 102. Meanwhile, the required power of the electric motor 9 is completely provided by the energy storage module 102.

When the electric power system 1 is in a fourth mode (Mode 4), the electric motor 9 is operated in the rapid deceleration stage or a brake stage and in the power generation mode. Under this circumstance, the electric motor 9 releases more electric energy. Meanwhile, a portion of the electric energy released from the electric motor 9 to the DC bus 12 is converted by the first power converter 100 and the second power converter 101, and transmitted to the power generator 8. Moreover, the other portion of the electric energy released from the electric motor 9 to the DC bus 12 is processed by the charge/discharge circuit 103 so as to charge the energy storage element 104. Consequently, the voltage of the DC bus 12 is kept stable.

When the electric power system 1 is in a fifth mode (Mode 5), the electric motor 9 is operated in the rapid deceleration stage or a brake stage and in the power generation mode. Similarly, a portion of the electric energy released from the electric motor 9 is converted by the first power converter 100 and the second power converter 101 and transmitted to the power generator 8, and another portion of the electric energy released from the electric motor 9 is processed by the charge/discharge circuit 103 so as to charge the energy storage element 104. In the fifth mode, the bus voltage of the DC bus 12 reaches an enable threshold. Meanwhile, the chopper circuit 105 is enabled under control of the control module 11. Consequently, the excess electric energy of the DC bus 12 is consumed.

Figure 2:
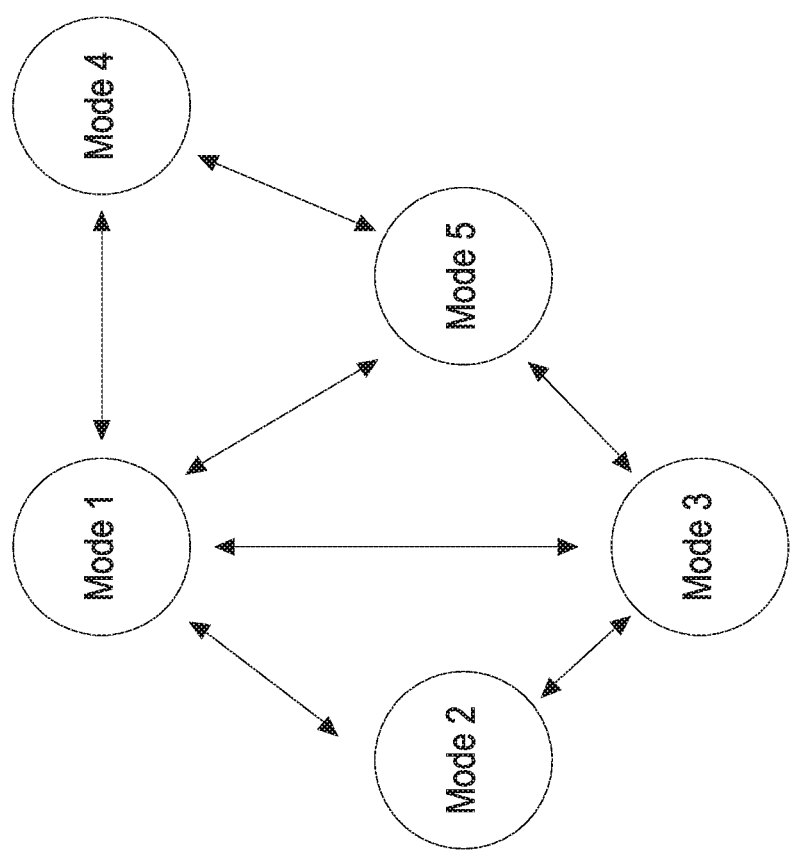
FIG. 2 schematically illustrates the mode-switching mechanism of the electric power system according to the first embodiment of the present invention.

FIG. 2 schematically illustrates the mode-switching mechanism of the electric power system according to the first embodiment of the present invention. In an embodiment, the electric power system 1 is switched from Mode 1 to Mode 2, Mode 3, Mode 4 or Mode 5. In another embodiment, the electric power system 1 is switched from Mode 2 to Mode 1 or Mode 3. In another embodiment, the electric power system 1 is switched from Mode 3 to Mode 1, Mode 2 or Mode 5. In another embodiment, the electric power system 1 is switched from Mode 4 to Mode 1 or Mode 5. In another embodiment, the electric power system 1 is switched from Mode 5 to Mode 1, Mode 3 or Mode 4. The mode of the electric power system 1 is switched according to the working condition of the electric motor 9.

FIGS. 3A~3D schematically illustrate the operating principles of the electric power system of the present invention. In response to the change of the output power Pout (i.e., the second power) of the variable-frequency drive 10 or the required power of the electric motor 9, the control module 11 controls the charge/discharge operation of the energy storage module 102. The output power Pchar of the energy storage module 102 can compensate the operational change of the electric motor 9 and reduce the influence of the operational change of the electric motor 9 on the received input power Pin of the variable-frequency drive 10. Consequently, the received input power of the variable-frequency drive 10 is kept stable. That is, when the operational change of the electric motor 9 occurs, the voltage at the DC bus 12 and the received input power of the variable-frequency drive 10 are stabilized. Under this circumstance, the smooth control of the input power is realized without detecting the voltage signal or the current signal of the power generator 8.

Figure 3A:
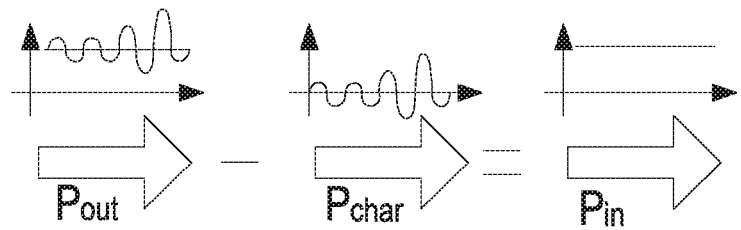
FIGS. 3A~3D schematically illustrate the operating principles of the electric power system of the present invention.

As shown in FIG. 3A, the output power Pout of the variable-frequency drive 10 is dynamically changed. That is, the required power of the electric motor 9 is dynamically changed. If the energy storage module 102 compensates the dynamic change of the output power of the variable-frequency drive 10, the influence of the operational change of the electric motor 9 on the received input power Pin of the variable-frequency drive 10 is minimized or eliminated.

Figure 3B:
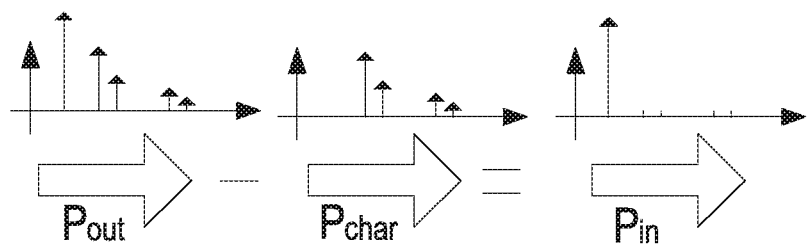

Then, a spectral decomposition is performed on the output power Pout of the variable-frequency drive 10, the output power Pchar of the energy storage module 102 and the input power Pin of the variable-frequency drive 10. Consequently, an obtained spectral diagram is shown in FIG. 3B. Please refer to FIG. 3B. The required power of the electric motor 9 is dynamically changed. That is, the output power Pout of the variable-frequency drive 10 is dynamically changed. After the output power Pout of the variable-frequency drive 10 is subjected to the spectral decomposition, a low frequency component and a high frequency component are acquired. If the high frequency component of the output power Pout is compensated by the energy storage module 102, the input power transmitted from the power generator 8 to the electric power system is maintained at the stable low frequency component. That is, the dynamic change of the input power is very low.

Figure 3C:
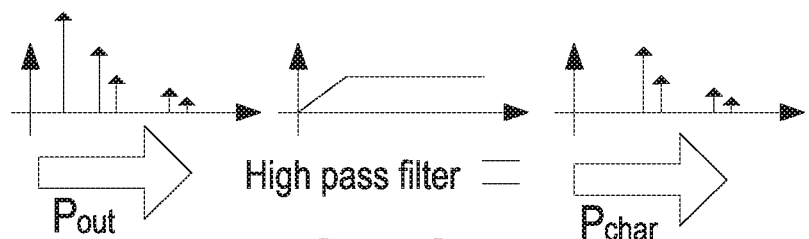

FIG. 3C schematically illustrates a method of obtaining the power spectrum of the energy storage module in order to compensate the dynamic change of the required power of the electric motor. After the output power Pout of the variable-frequency drive 10 is subjected to the spectral decomposition, the low frequency component is filtered off by a high pass filter with a specified bandwidth. Then, the retained high frequency component of the output power Pout is compensated by the energy storage module 102.

Figure 3D:
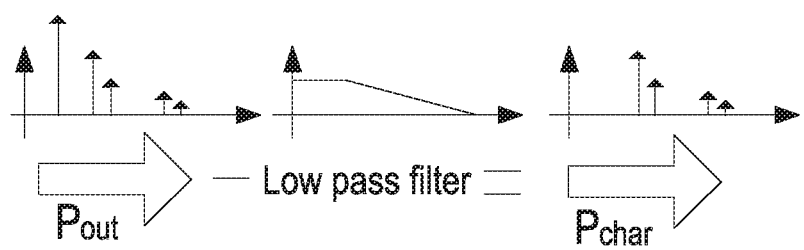

FIG. 3D schematically illustrates another method of obtaining the power spectrum of the energy storage module in order to compensate the dynamic change of the required power of the electric motor. After the output power Pout of the variable-frequency drive 10 is subjected to the spectral decomposition, the low frequency component passing through a low pass filter is subtracted by the output power Pout. Then, the retained high frequency component of the output power Pout is compensated by the energy storage module 102.

Figure 4:
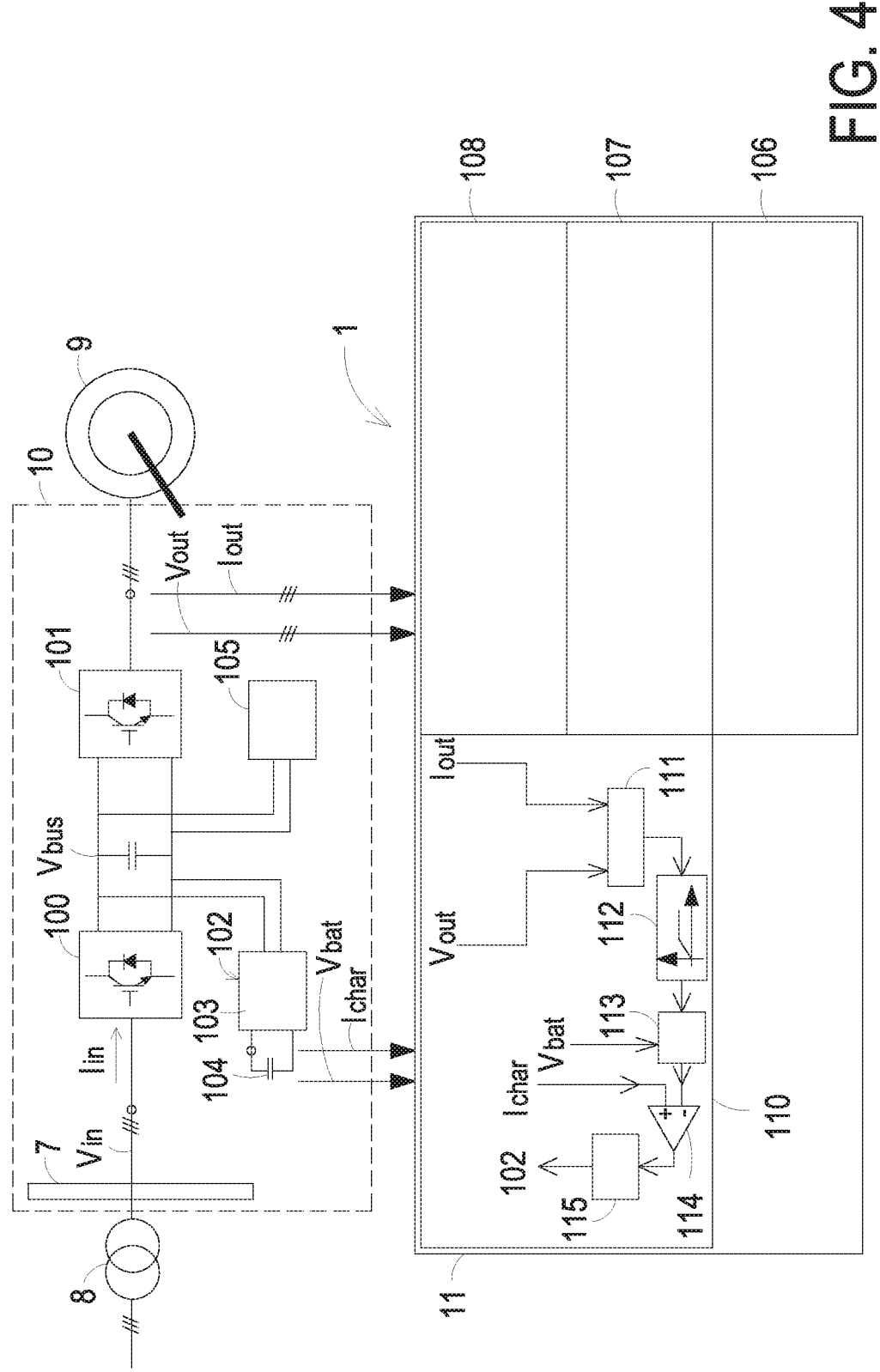
FIG. 4 is a schematic circuit diagram illustrating the electric power system and the control module according to the first embodiment of the present invention.

FIG. 4 is a schematic circuit diagram illustrating the electric power system and the control module according to the first embodiment of the present invention. Please refer to FIGS. 1 and 4. The control module 11 further comprises an energy storage controller 110. The energy storage controller 110 comprises a spectral computing unit 111, a high pass filter 112, a current computing unit 113, a comparing unit 114 and an adjusting unit 115. The spectral computing unit 111 is connected with the variable-frequency drive 10. According to plural parameters of the variable-frequency drive 10, the spectral computing unit 111 calculates the output power Pout of the variable-frequency drive 10 (i.e., the second power or the required power of the electric motor 9). For example, the plural parameters of the variable-frequency drive 10 contain an output current Iout and an output voltage Vout of the variable-frequency drive 10. After the output power Pout of the variable-frequency drive 10 is subjected to the spectral decomposition, a spectral sequence of the output power is acquired. The high pass filter 112 is connected with the spectral computing unit 111 for filtering off the low frequency component of the spectral sequence. Consequently, a compensated power in a high frequency range (i.e., the output power Pchar of the energy storage module 102) is acquired. The current computing unit 113 is connected with the high pass filter 112. According to a battery voltage Vbat of the energy storage element 104 and the compensated power, the current computing unit 113 calculates a reference current. The comparing unit 114 is connected with the current computing unit 113. By comparing the reference current with a real current Ichar of the energy storage element 104, the comparing unit 114 outputs a comparing result. The adjusting unit 115 is connected with the comparing unit 114. According to the comparing result, the adjusting unit 115 controls the operations of the energy storage module 102 and adjusts the real current Ichar of the energy storage element 104.

In case that the output power Pchar is positive, the energy storage module 102 discharges electricity to transmit electric energy to the electric motor 9. Whereas, in case that the output power Pchar is negative, the charge operation of the energy storage module 102 is performed to receive the charged energy from the power generator 8 or the feedback energy from the electric motor 9.

In this embodiment, the control module 11 further comprises a chopper controller 106. If the bus voltage of the DC bus 12 reaches the enable threshold, the chopper circuit 105 is enabled under control of the chopper controller 106. Consequently, the excess electric energy of the DC bus 12 is consumed. Moreover, if the bus voltage of the DC bus 12 reaches a disable threshold, the chopper circuit 105 is disabled under control of the chopper controller 106. That is, the chopper controller 106 uses a hysteresis comparison method to control whether the chopper circuit 105 is enabled or not. Generally, if the change of the required power of the electric motor 9 is very large, the energy storage module 102 is possibly unable to make an immediate response and the bus voltage of the DC bus 12 is abruptly increased to damage the electronic component. In accordance with the present invention, the uses of the chopper circuit 105 and the chopper controller 106 can overcome the above drawbacks.

The control module 11 further comprises a first power converter controller 107. The first power converter controller 107 samples the input voltage Vin, the input current Iin and the bus voltage Vbus and controls the operations of the first power converter 100. Consequently, the bus voltage Vbus is kept stable, and the input current Iin is adjusted to follow the input voltage Vin. Under this circumstance, the quality of the power grid is enhanced. In some embodiment, the first power converter controller 107 controls the operations of the first power converter 100 by a double loop control mechanism. That is, an outer DC voltage loop and an inner current loop are used for realizing the double loop control mechanism.

The control module 11 further comprises a second power converter controller 108. The second power converter controller 108 samples the rotating speed n of the electric motor 9 and the input current Iin. Moreover, the second power converter controller 108 controls the operations of the second power converter 101 by a double loop control mechanism including a rotating speed loop and a current loop. The rotating speed n of the electric motor 9 is detected by a speed detector (not shown). Alternatively, the rotating speed n of the electric motor 9 is detected by sampling and calculating the output voltage Vout that is outputted from the electric power system 1 to the electric motor 9.

Figure 5:
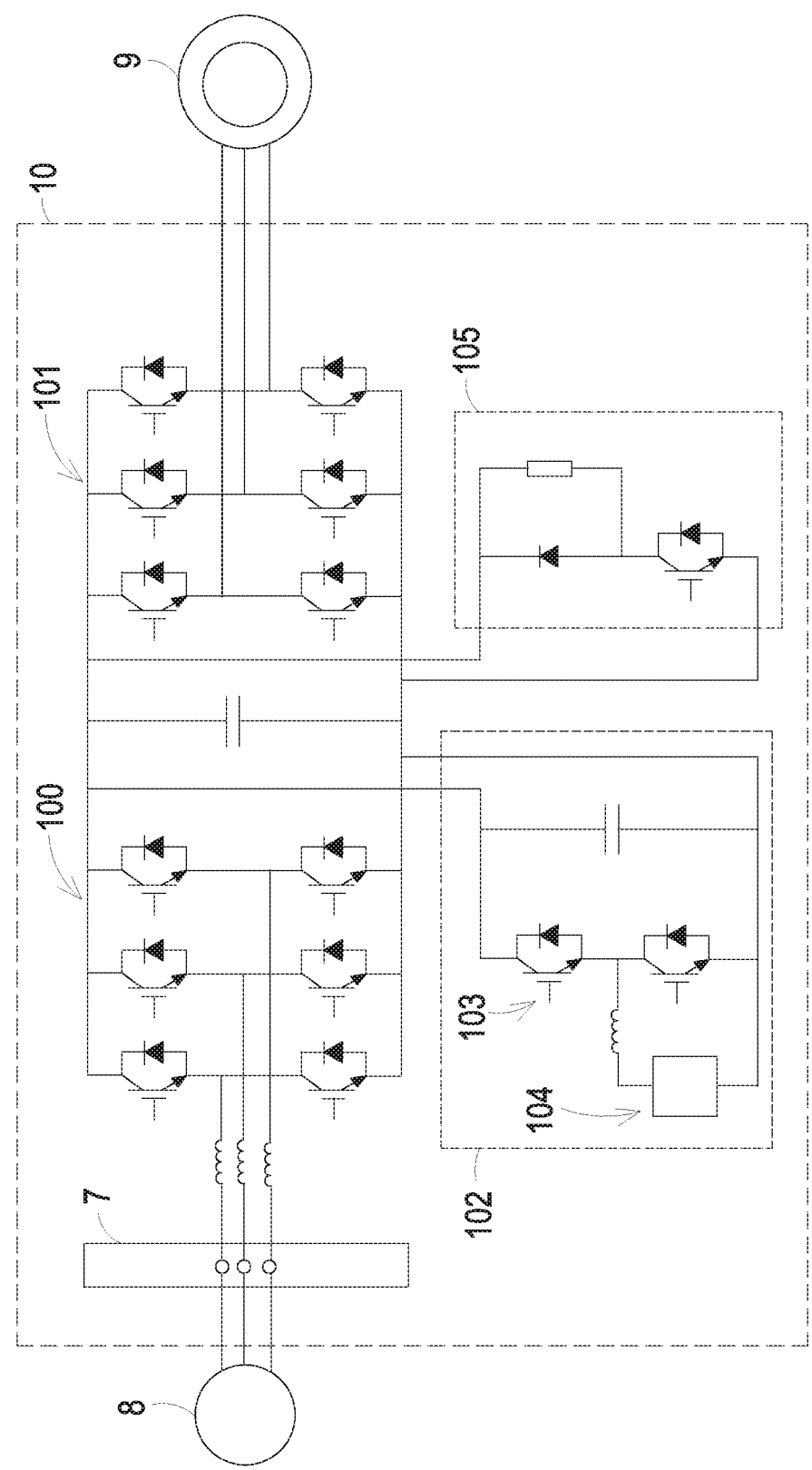
FIG. 5 is a schematic circuit diagram illustrating the variable-frequency drive of the electric power system according to the first embodiment of the present invention.

FIG. 5 is a schematic circuit diagram illustrating the variable-frequency drive of the electric power system according to the first embodiment of the present invention. In this embodiment, the first power converter 100 and the second power converter 101 have back-to-back circuitry configurations. Moreover, the first power converter 100 and the second power converter 101 have two-level circuitry configurations. The charge/discharge circuit 103 is a non-isolated DC-to-DC converter that is capable of converting electric energy in a bidirectional manner. In an embodiment, the charge/discharge circuit 103 comprises an inductor, a capacitor and two serially-connected switch elements. The chopper circuit 105 also has a two-level circuitry configuration. In an embodiment, the chopper circuit 105 comprises a bleeder resistor, a diode and a switch element, wherein the diode and the switch element are connected with each other in series.

Figure 6:
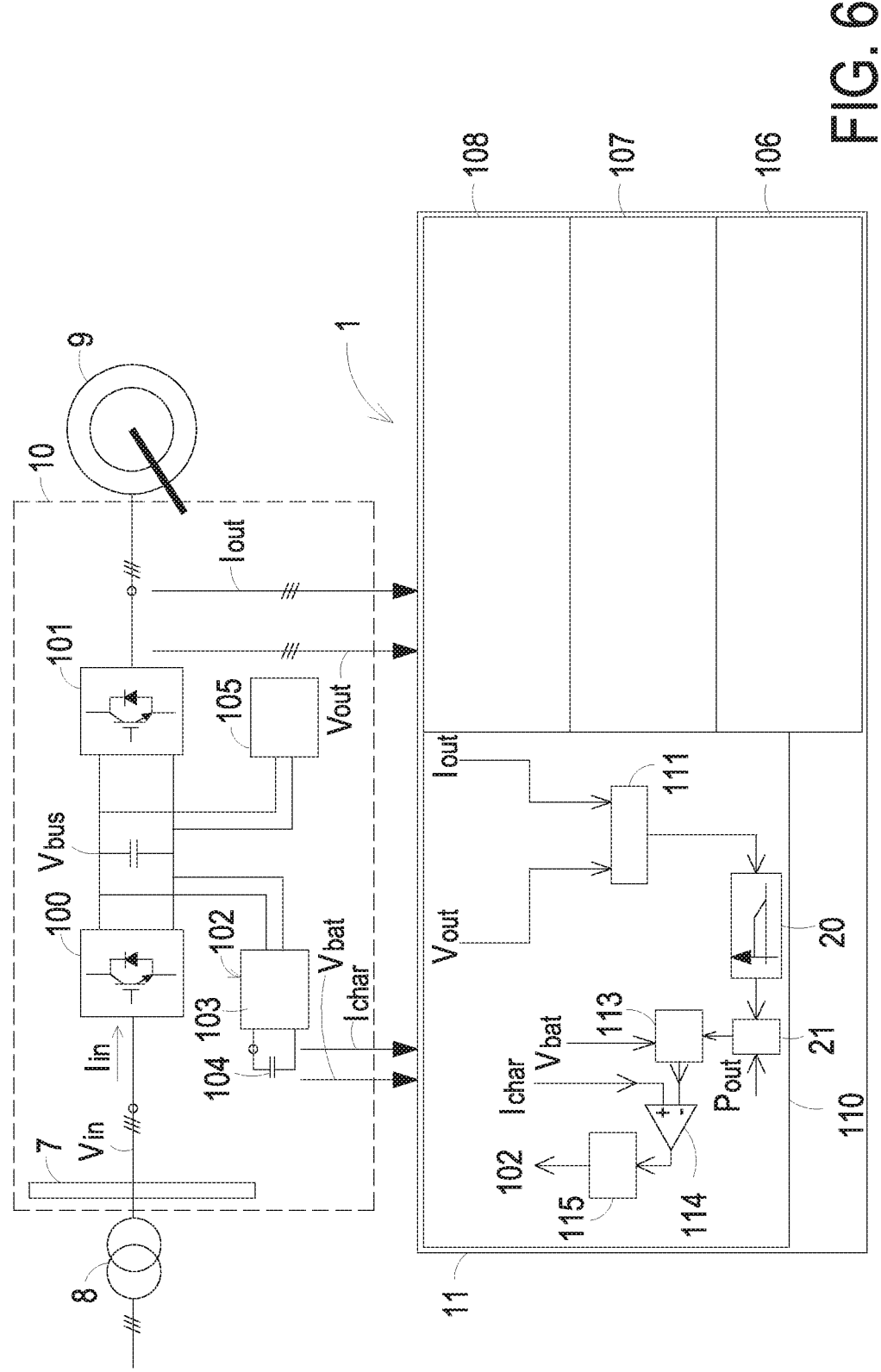
FIG. 6 is a schematic circuit diagram illustrating an electric power system and a control module according to a second embodiment of the present invention.

Please refer to FIG. 3D and FIG. 6. FIG. 6 is a schematic circuit diagram illustrating an electric power system and a control module according to a second embodiment of the present invention. As mentioned above in FIG. 3D, after the output power Pout of the variable-frequency drive 10 is subjected to the spectral decomposition, the low frequency component passing through a low pass filter is subtracted by the output power Pout. Then, the retained high frequency component of the output power Pout is compensated by the energy storage module 102. In this embodiment as shown in FIG. 6, a low pass filter 20 and a subtractor 21 are used in replace of the high pass filter 112 of FIG. 4. The low pass filter 20 is connected with the spectral computing unit 111 for filtering off a high frequency component of the spectral sequence. Consequently, a transition power in a low frequency range is acquired. The subtractor 21 receives the transition power from the low pass filter 20 and the output power Pout from the variable-frequency drive 10. After the transition power is subtracted from the output power Pout, the subtractor 21 outputs a compensated power to the current computing unit 113. The operations of the other components of the control module of this embodiment are similar to those of the first embodiment, and are not redundantly described herein.

Figure 7:
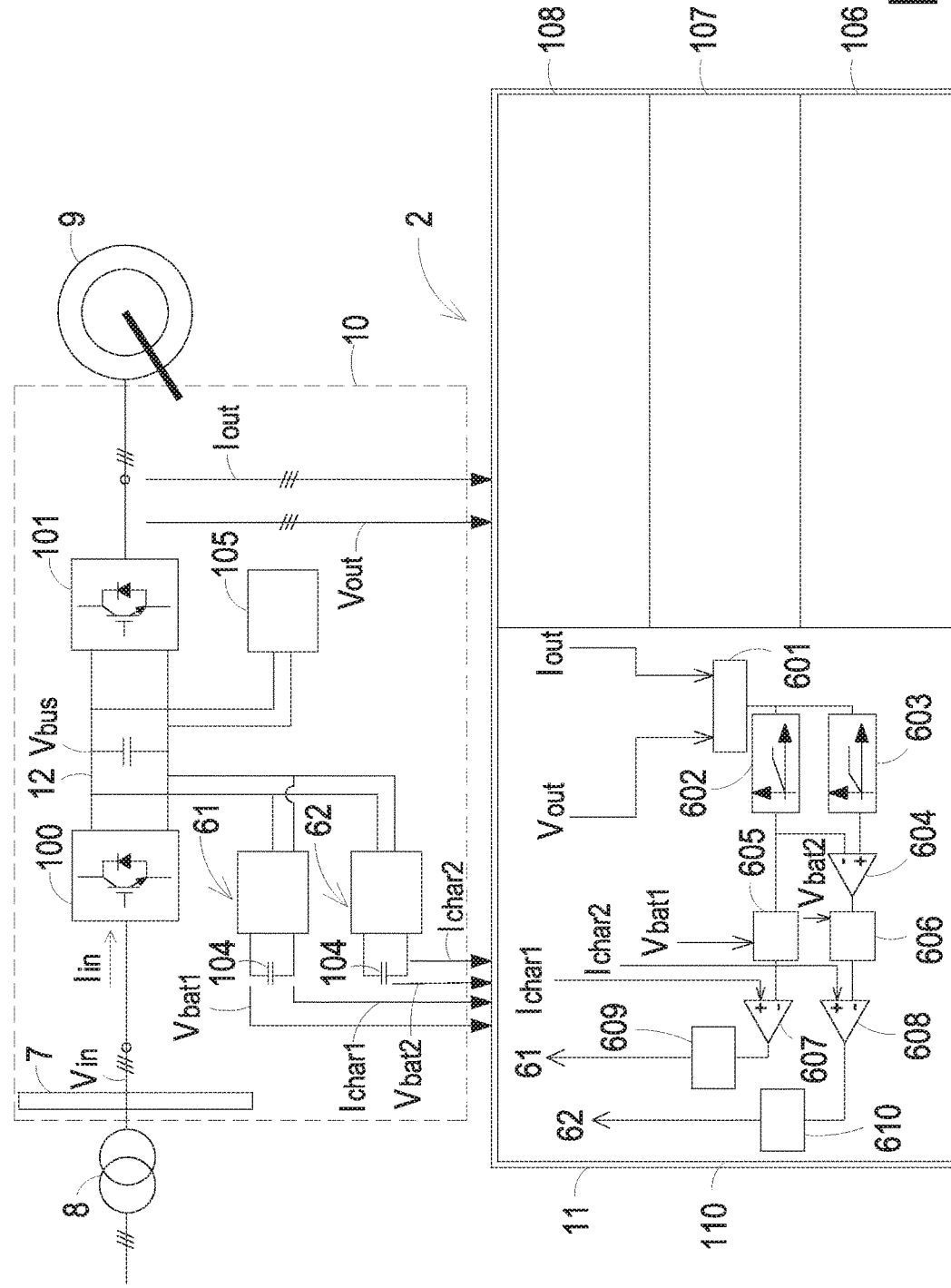
FIG. 7 is a schematic circuit diagram illustrating an electric power system and a control module according to a third embodiment of the present invention.

FIG. 7 is a schematic circuit diagram illustrating an electric power system and a control module according to a third embodiment of the present invention. Component parts and elements corresponding to those of the first embodiment are designated by identical numeral references, and detailed descriptions thereof are omitted. As mentioned above, the electric power system 1 of the first embodiment has a single energy storage module 102. Whereas, the electric power system 2 of this embodiment comprises two energy storage modules. As shown in FIG. 7, the electric power system 2 comprises a first energy storage module 61 and a second energy storage module 62. In this embodiment, the energy storage controller 110 of the control module 11 comprises a spectral computing unit 601, a first high pass filter 602, a second high pass filter 603, a differential comparator 604, a first current computing unit 605, a second current computing unit 606, a first comparing unit 607, a second comparing unit 608, a first adjusting unit 609 and a second adjusting unit 610. The energy storage element 104 of the first energy storage module 61 and the energy storage element 104 of the second energy storage module 62 have different characteristics.

The spectral computing unit 601 is connected with the variable-frequency drive 10. According to plural parameters of the variable-frequency drive 10, the spectral computing unit 601 calculates the output power Pout of the variable-frequency drive 10 (i.e., the required power of the electric motor 9). For example, the plural parameters of the variable-frequency drive 10 contain an output current Tout and an output voltage Vout of the variable-frequency drive 10. After the output power Pout of the variable-frequency drive 10 is subjected to the spectral decomposition, a spectral sequence of the output power is acquired. The first high pass filter 602 is connected with the spectral computing unit 601 for filtering off a first low frequency component of the spectral sequence. Consequently, a first compensated power in a first high frequency range is acquired. The second high pass filter 603 is connected with the spectral computing unit 601 for filtering off a second low frequency component of the spectral sequence. Consequently, a second compensated power in a second high frequency range is acquired. The bandwidth of the first high pass filter 602 and the bandwidth of the second high pass filter 603 are different. Consequently, the first high frequency range of the first compensated power is different from the second high frequency range of the second compensated power. Preferably but not exclusively, the bandwidth of the second high pass filter 603 is larger than bandwidth of the first high pass filter 602. A non-inverted input terminal of the differential comparator 604 is connected with the second high pass filter 603. An inverted input terminal of the differential comparator 604 is connected with the first high pass filter 602. After the first compensated power from the first high pass filter 602 and the second compensated power from the second high pass filter 603 are compared by the differential comparator 604, the differential comparator 604 outputs a differential power. The first current computing unit 605 is connected with the first high pass filter 602. According to a first battery voltage Vbat1 of the energy storage element 104 of the first energy storage module 61 and the first compensated power, the first current computing unit 605 calculates a first reference current. The second current computing unit 606 is connected with the differential comparator 604. According to a second battery voltage Vbat2 of the energy storage element 104 of the second energy storage module 62 and the differential power, the second current computing unit 606 calculates a second reference current. The first comparing unit 607 is connected with the first current computing unit 605. By comparing the first reference current with a first real current Ichar1 of the energy storage element 104 of the first energy storage module 61, the first comparing unit 607 outputs a first comparing result. The second comparing unit 608 is connected with the second current computing unit 606. By comparing the second reference current with a second real current Ichar2 of the energy storage element 104 of the second energy storage module 62, the second comparing unit 608 outputs a second comparing result. The first adjusting unit 609 is connected with the first comparing unit 607. According to the first comparing result, the first adjusting unit 609 controls the operations of the first energy storage module 61 and adjusts the first real current Ichar1 of the energy storage element 104 of the first energy storage module 61. The second adjusting unit 610 is connected with the second comparing unit 608. According to the second comparing result, the second adjusting unit 610 controls the operations of the second energy storage module 62 and adjusts the second real current Ichar2 of the energy storage element 104 of the second energy storage module 62.

In the electric power system 2, the energy storage element 104 of the first energy storage module 61 and the energy storage element 104 of the second energy storage module 62 have different capability according to the high frequency components of the spectral sequence. For the energy storage element 104 with higher energy density (e.g., a lead-acid battery or a lithium battery), the second high pass filter 603 is used to process the component in the lower frequency band (e.g., 2~20 Hz). For the energy storage element 104 with lower energy density (e.g., an ultracapacitor), the first high pass filter 602 is used to process the component in the higher frequency band (e.g., >20 Hz). The electric power system 2 is cost-effective. Moreover, the utilization and life of the first energy storage module 61 and the utilization and life of the second energy storage module 62 are enhanced.

Figure 8:
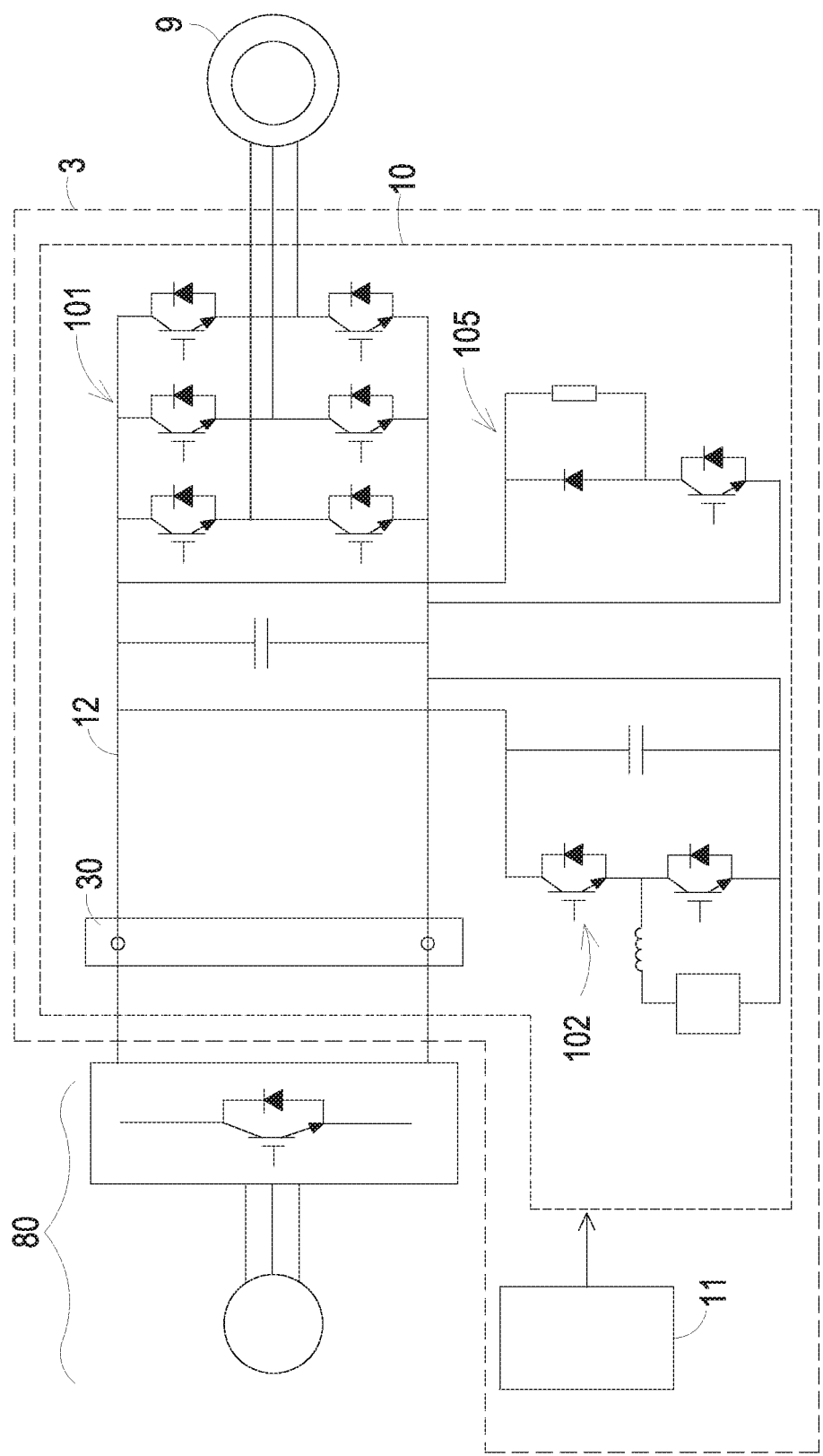
FIG. 8 is a schematic circuit block diagram illustrating an electric power system according to a fourth embodiment of the present invention.
Figure 9:
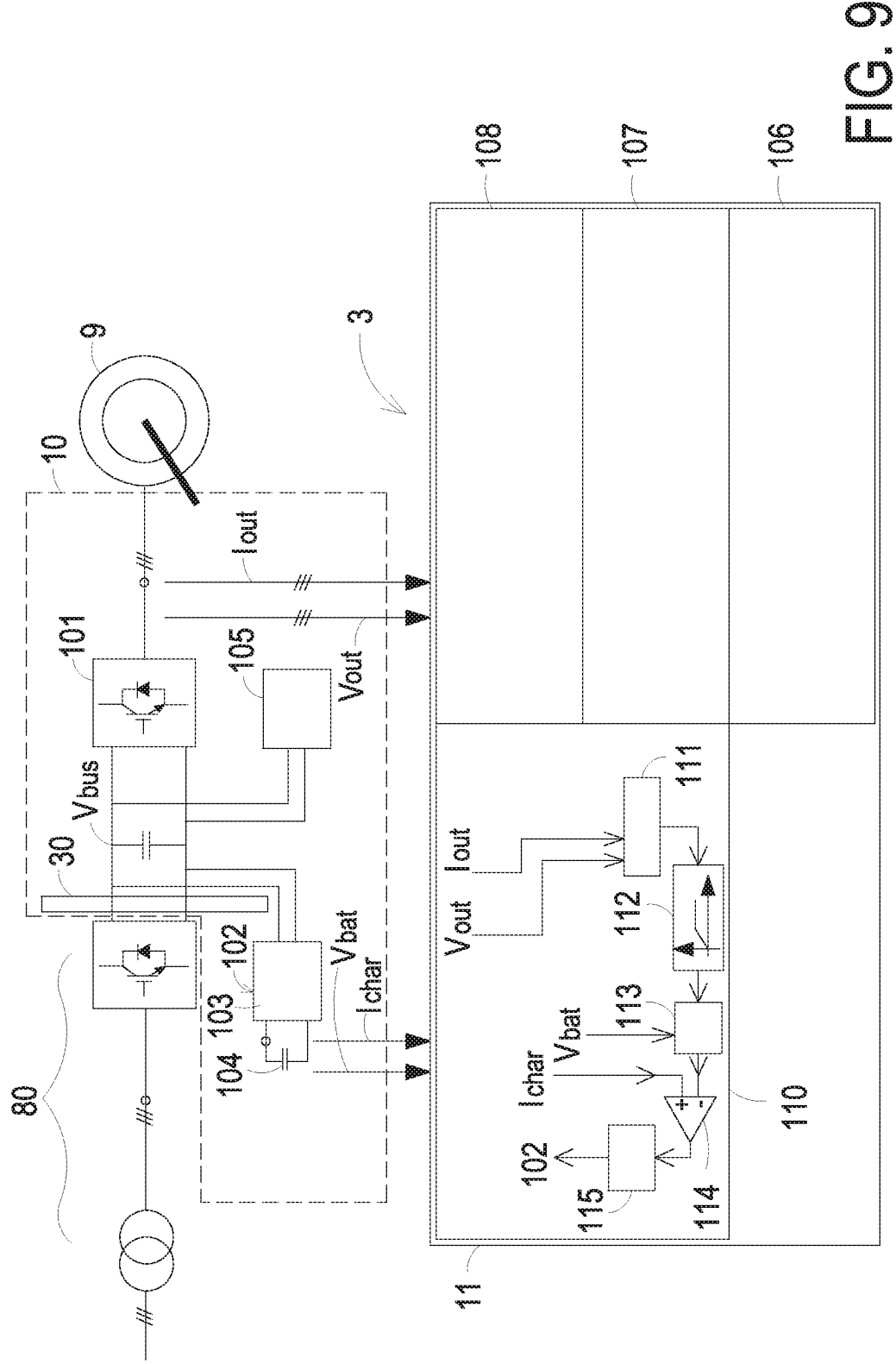
FIG. 9 is a schematic circuit diagram illustrating an electric power system and a control module according to the fourth embodiment of the present invention.

FIG. 8 is a schematic circuit block diagram illustrating an electric power system according to a fourth embodiment of the present invention. FIG. 9 is a schematic circuit diagram illustrating an electric power system and a control module according to the fourth embodiment of the present invention. Component parts and elements corresponding to those of the first embodiment are designated by identical numeral references, and detailed descriptions thereof are omitted. As mentioned above, the power generator for the electric power system 1 of the first embodiment is a three-phase AC power generator. Whereas, the variable-frequency drive 10 of the electric power system 3 of this embodiment is connected with a DC generating system 80. Consequently, the first power converter 100 of the first embodiment is not included in the variable-frequency drive 10 of the electric power system 3. In some embodiments, the function of the first power converter 100 is integrated into the DC generating system 80. In this embodiment, the variable-frequency drive 10 of the electric power system 3 comprises a second power converter 101 and at least one energy storage module 102. In this embodiment, the second power converter 101 is an inverter circuit for converting the DC energy into AC output energy and outputting the AC output energy to the inductive load. The energy storage module 102 is connected with the inverter circuit in order to perform a charge/discharge operation. As mentioned above, the distribution board 7 of the first embodiment is connected between the power generator 8 and the first power converter 100 of the variable-frequency drive 10. In the electric power system 3 of this embodiment, a distribution board 30 is connected between the DC generating system 80 and the variable-frequency drive 10 and connected with the DC bus 12. Moreover, the distribution board 30 is a DC distribution board.

Figure 10:
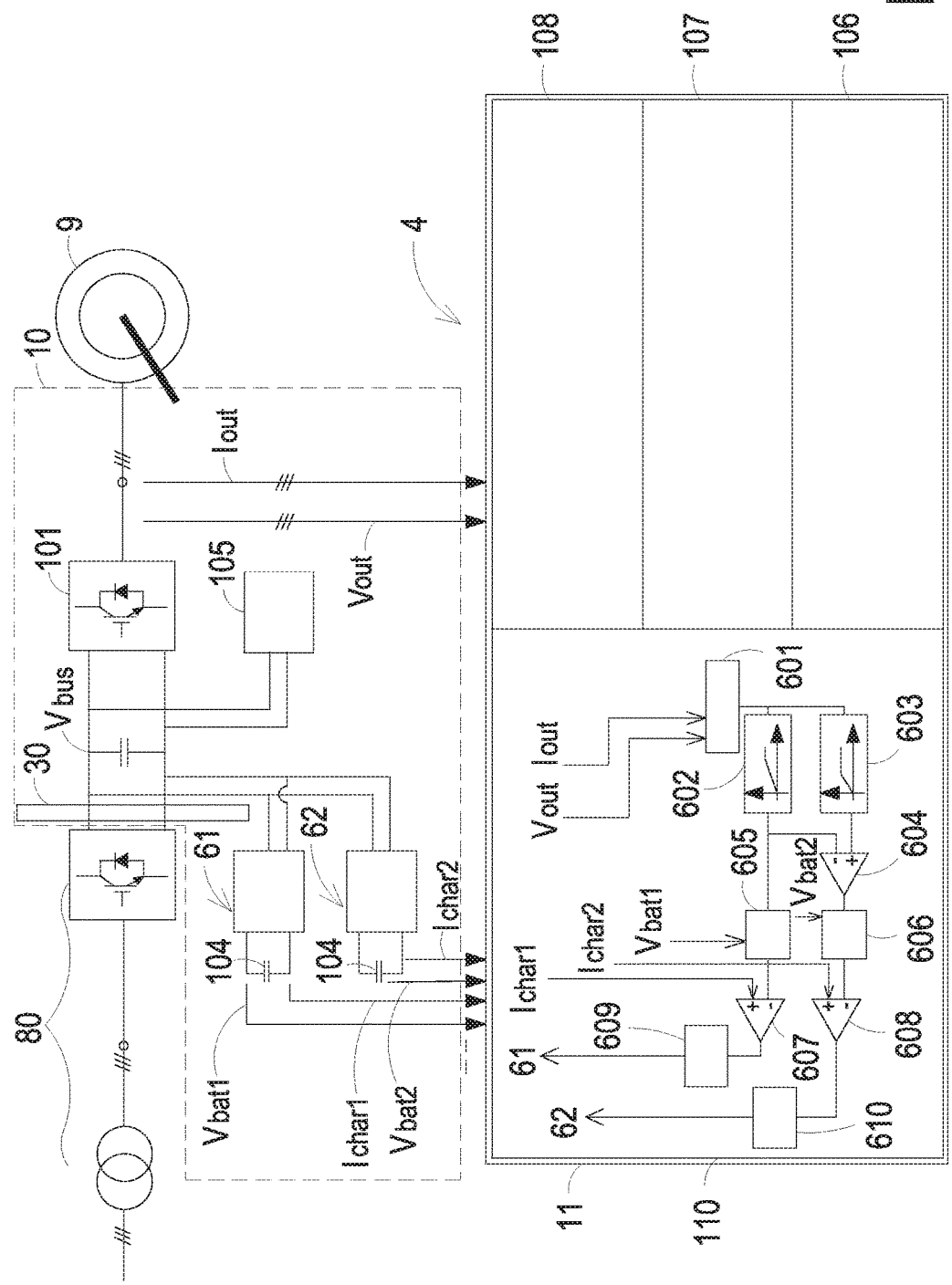
FIG. 10 is a schematic circuit diagram illustrating an electric power system and a control module according to a fifth embodiment of the present invention.

FIG. 10 is a schematic circuit diagram illustrating an electric power system and a control module according to a fifth embodiment of the present invention. Component parts and elements corresponding to those of FIG. 7 and FIG. 9 are designated by identical numeral references, and detailed descriptions thereof are omitted. As mentioned above, the electric power system 3 of FIG. 9 has a single energy storage module 102. Like the electric power system 2 of FIG. 7, the electric power system 4 of this embodiment comprises plural energy storage modules. The electric power system 4 comprises a first energy storage module 61 and a second energy storage module 62. In this embodiment, the energy storage controller 110 of the control module 11 comprises a spectral computing unit 601, a first high pass filter 602, a second high pass filter 603, a differential comparator 604, a first current computing unit 605, a second current computing unit 606, a first comparing unit 607, a second comparing unit 608, a first adjusting unit 609 and a second adjusting unit 610. The functions and actions of the first energy storage module 61, the second energy storage module 62 and the energy storage controller 110 are similar to those of FIG. 7, and are not redundantly described herein.

Figure 11:
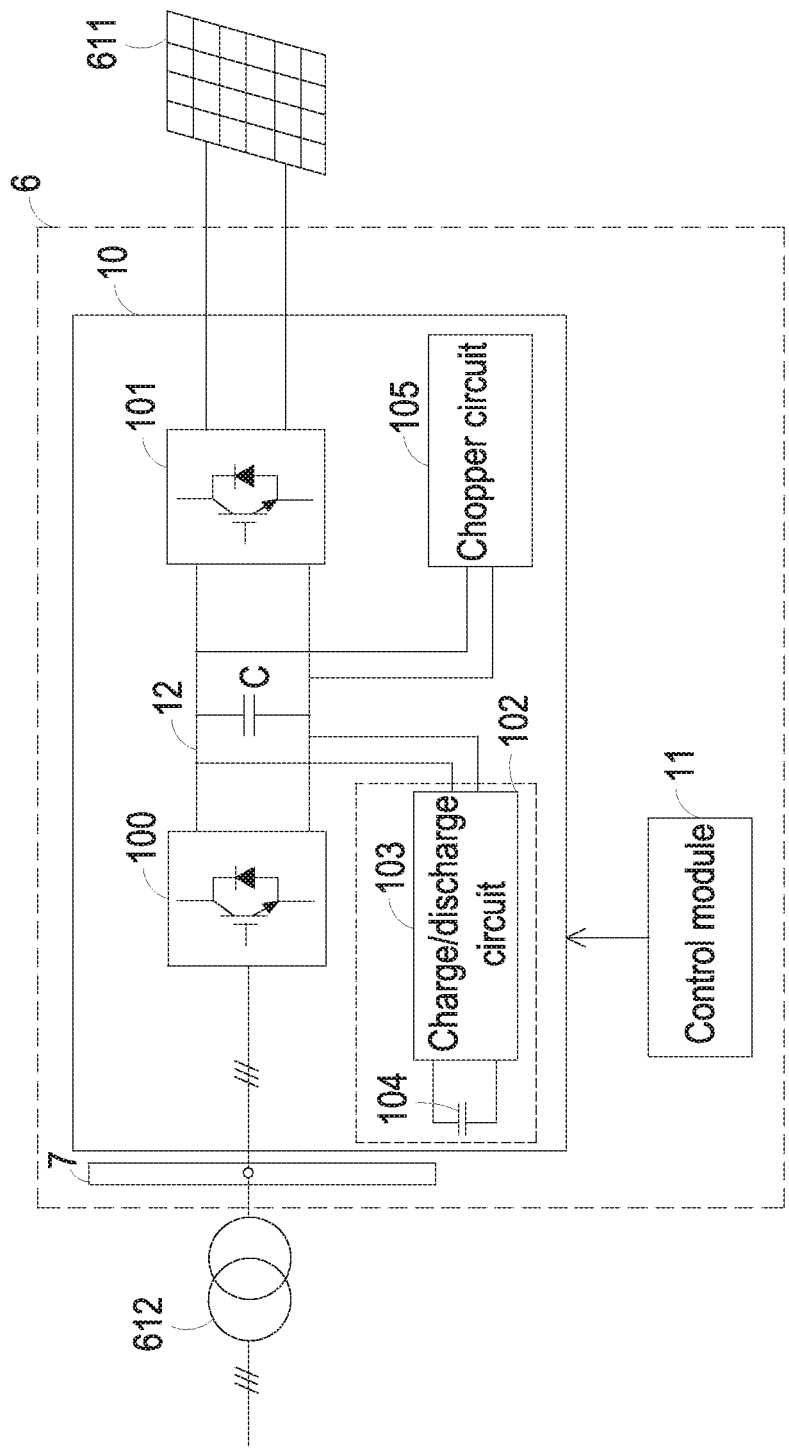
FIG. 11 is a schematic circuit block diagram illustrating an electric power system for a photovoltaic power generation apparatus according to an embodiment of the present invention.
Figure 12:
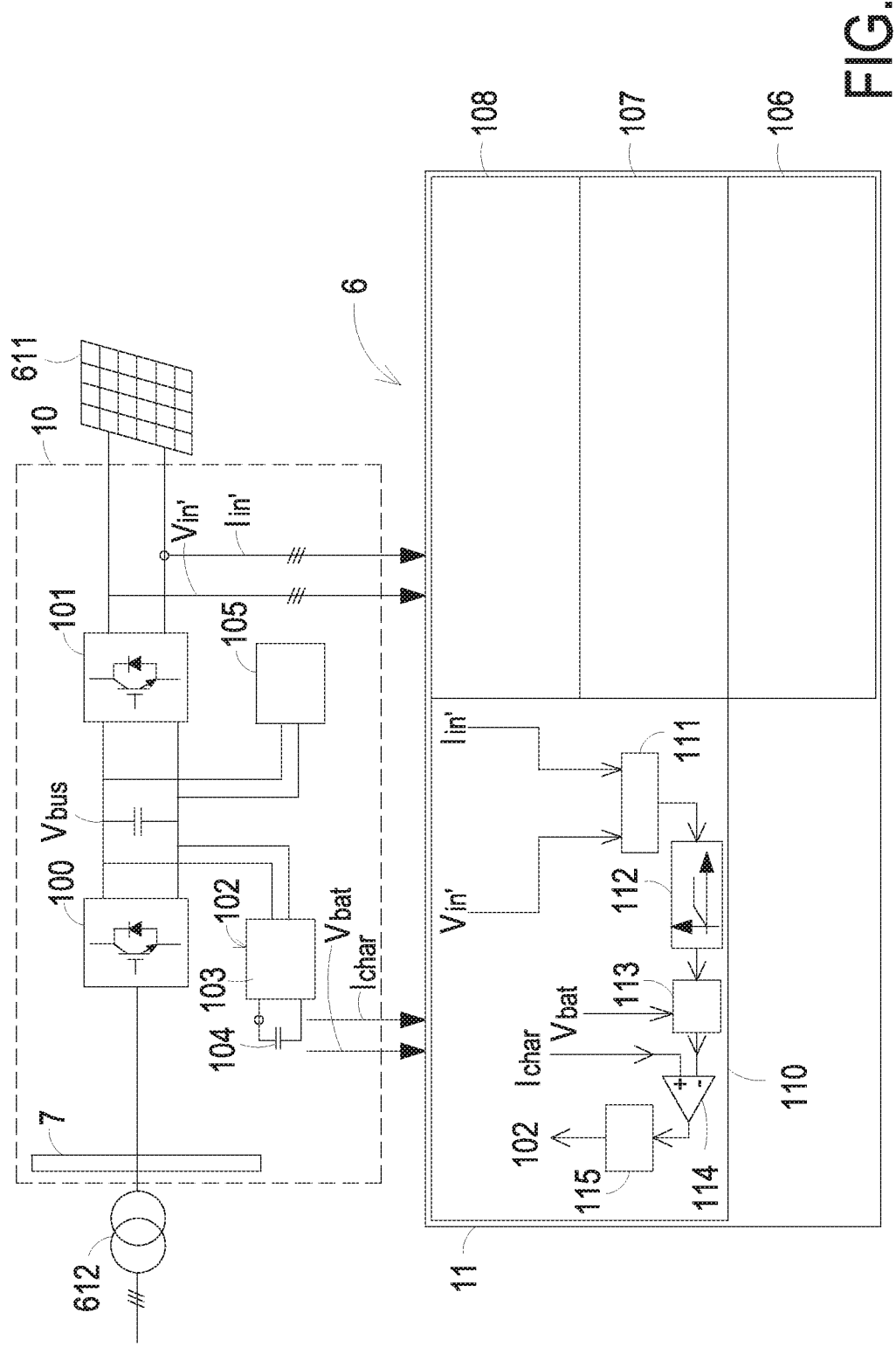
FIG. 12 is a schematic circuit diagram illustrating an electric power system and a control module of FIG. 11.

Moreover, the electric power system can be applied to a photovoltaic power generation apparatus or a wind power generation apparatus. FIG. 11 is a schematic circuit block diagram illustrating an electric power system for a photovoltaic power generation apparatus according to an embodiment of the present invention. FIG. 12 is a schematic circuit diagram illustrating an electric power system and a control module of FIG. 11. The electric power system 6 is applied to a photovoltaic power generation apparatus. The electric power system 6 is connected between a photovoltaic power generator 611 and a power grid 612. The circuitry architecture and operating principle of the electric power system 6 are similar to the electric power system 1 of the first embodiment. Component parts and elements corresponding to those of the first embodiment are designated by identical numeral references, and detailed descriptions thereof are omitted. In comparison with the electric power system 1 of the first embodiment, the electric power system 6 of this embodiment receives a second power from the photovoltaic power generator 611 (i.e., an input power) and converts the second power into a first power (i.e., an output power). The output power is transmitted to the power grid 612. In this embodiment, the second power converter 101 is a DC/DC converter for converting a DC input power corresponding to the input power into transition DC energy. Moreover, the first power converter 100 is an inverter circuit for converting the transition DC energy into AC output energy corresponding to the first power and outputting the AC output energy to the power grid 612.

The control module 11 controls operations of the variable-frequency drive 10 according to associated parameters of the variable-frequency drive 10. Moreover, as the second power is dynamically changed, the control module 11 controls a charge/discharge operation of the energy storage module 102 so as to compensate the operational change of the photovoltaic power generator 611 and reduce an influence of the operational change of the photovoltaic power generator 611 on the first power (i.e., the output power to be received by the power grid 612). Under this circumstance, the smooth control of the output power to the power grid 612 is realized.

In this embodiment, the spectral computing unit 111 of the control module 11 calculates the input power of the variable-frequency drive 10 according to plural parameters of the variable-frequency drive 10. For example, the plural parameters of the variable-frequency drive 10 contain an input current Iin' and an input voltage Vin' of the variable-frequency drive 10.

The objects and operating principles of the electric power system 6 of this embodiment are similar to those of the electric power system 1 of the first embodiment except for the direction of transmitting the electric energy and the operation modes. Those skilled in the art can understand the operating principles and efficacy of the electric power system 6 of this embodiment while retaining the teachings of the electric power system 1 of the first embodiment. Consequently, only the special aspects of the electric power system 6 are illustrated in this description. The component parts and elements corresponding to those of the first embodiment are not redundantly described herein.

When the photovoltaic power generator 611 has an operational change (e.g., the change of electricity quantity), the second power from the photovoltaic power generator 611 is changed. As the second power is dynamically changed, the control module 11 controls a charge/discharge operation of the energy storage module 102 so as to compensate the operational change of the photovoltaic power generator 611 and reduce an influence of the operational change of the photovoltaic power generator 611 on the first power. Under this circumstance, the smooth control of the output power to the power grid 612 is realized.

Figure 13:
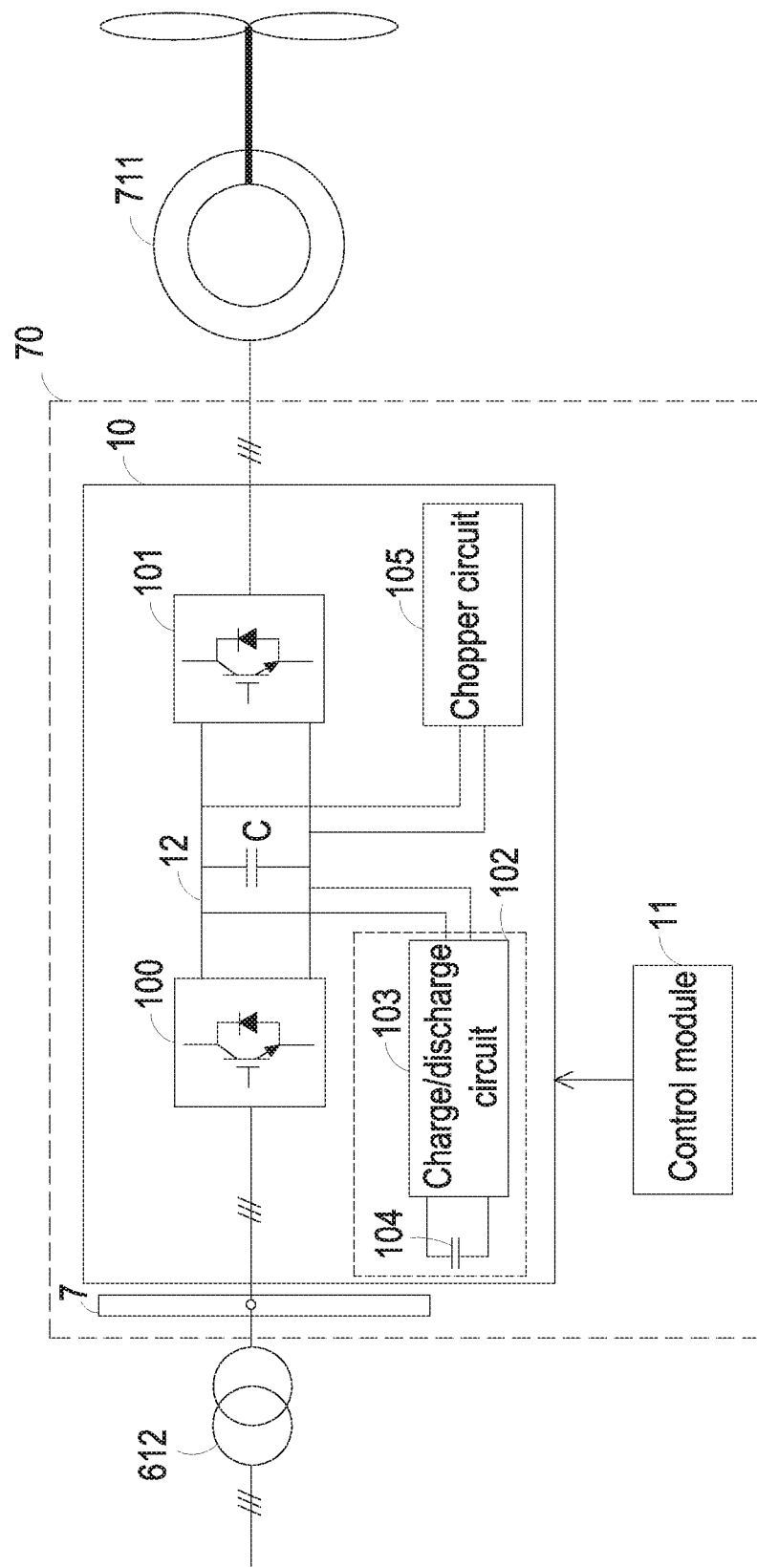
FIG. 13 is a schematic circuit block diagram illustrating an electric power system for a wind power generation apparatus according to an embodiment of the present invention.
Figure 14:
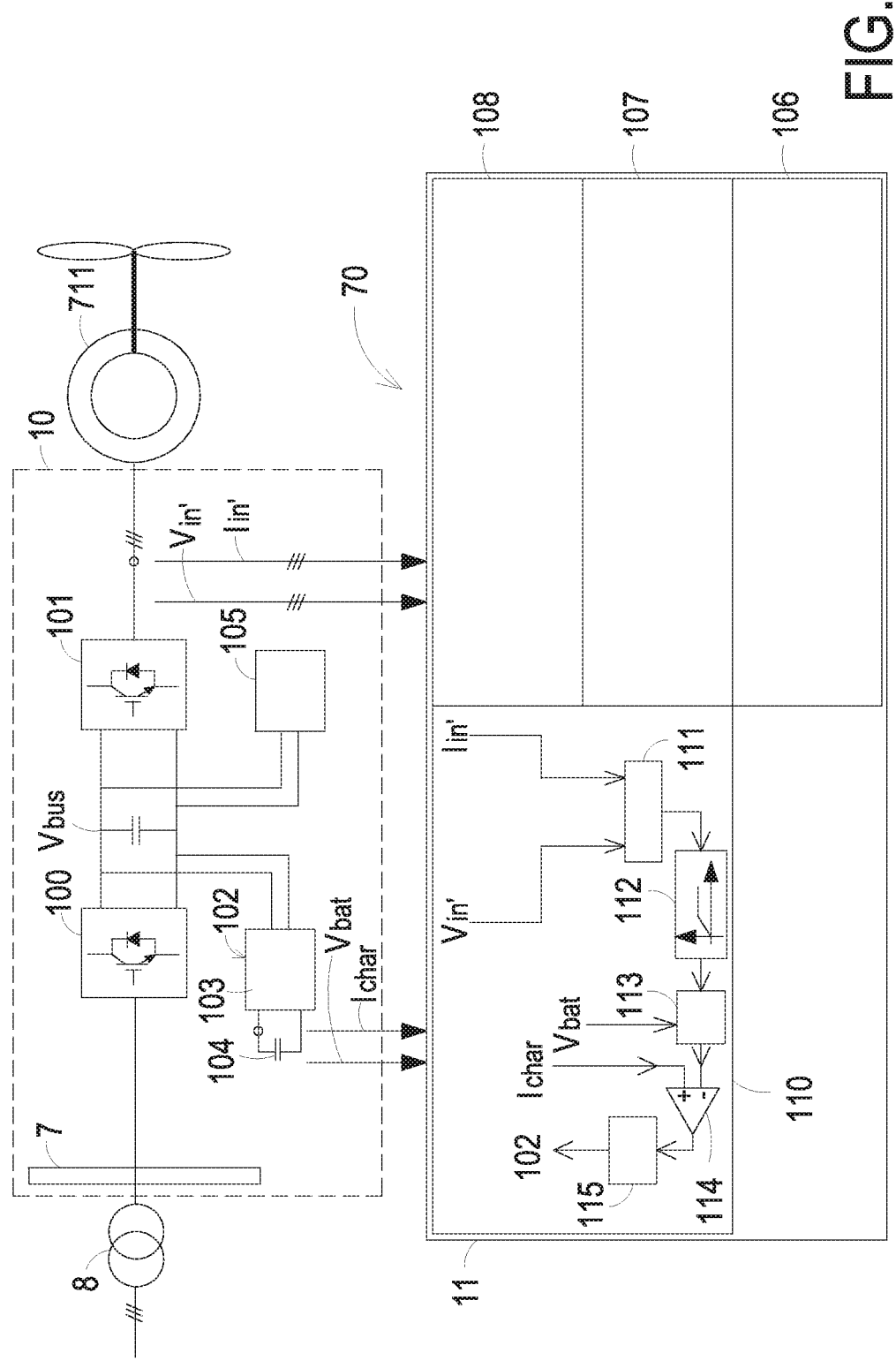
FIG. 14 is a schematic circuit diagram illustrating an electric power system and a control module of FIG. 13.

FIG. 13 is a schematic circuit block diagram illustrating an electric power system for a wind power generation apparatus according to an embodiment of the present invention. FIG. 14 is a schematic circuit diagram illustrating an electric power system and a control module of FIG. 13. The electric power system 70 is applied to a wind power generation apparatus. The electric power system 70 is connected between a wind power generator 711 and a power grid 612. The circuitry architecture and operating principle of the electric power system 70 are similar to the electric power system 6 of FIGS. 11 and 12. Component parts and elements corresponding to those of the electric power system 6 are designated by identical numeral references, and detailed descriptions thereof are omitted.

Figure 15:
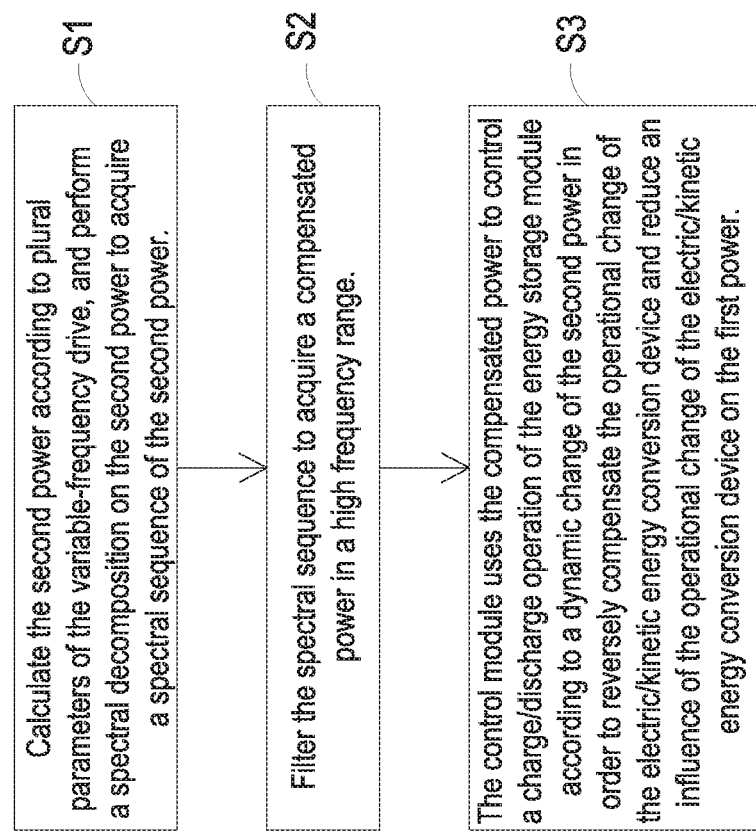
FIG. 15 is a flowchart illustrating a control method of an electric power system according to an embodiment of the present invention.

FIG. 15 is a flowchart illustrating a control method of an electric power system according to an embodiment of the present invention. Firstly, in a step S1, the second power of the variable-frequency drive 10 is calculated according to plural parameters of the variable-frequency drive 10, and a spectral decomposition is performed on the second power to acquire a spectral sequence. Then, in a step S2, the spectral sequence is filtered, so that a compensated power in a specified frequency range is acquired. In a step S3, the control module 11 uses the compensated power to control a charge/discharge operation of the energy storage module 102 according to a dynamic change of the second power, so that the operational change of the electric/kinetic energy conversion device (e.g. the electric motor 9 in the first embodiment) is compensated and the influence of the operational change of the electric/kinetic energy conversion device on the first power is reduced. For example, the input power is kept stable in the first embodiment.

The step S3 further comprises three sub-steps. In a first sub-step, a reference current is calculated according to a battery voltage of the energy storage element 104 and the compensated power. In a second sub-step, the reference current is compared with a real current Ichar of the energy storage element 104, and thus a comparing result is outputted. In a third sub-step, the control module 11 controls the operations of the energy storage module 102 and adjusts the real current Ichar of the energy storage element 104 according to the comparing result. According to the operational change of the electric/kinetic energy conversion device (e.g., an electric motor 9, the photovoltaic power generator 611 or the windpower generator 711), the control module 11 controls a charge/discharge operation of the energy storage module 102 so as to compensate the operational change of the electric/kinetic energy conversion device.

In the step S2, if the control module 11 uses the high pass filter 112 as shown in FIG. 4, a low frequency component of the spectral sequence is filtered off. Consequently, the compensated power in a high frequency range is acquired. Whereas, if the control module 11 uses the low pass filter 20 as shown in FIG. 6, the step S2 comprises two sub-steps. In the first sub-step, a high frequency component of the spectral sequence is filtered off. Consequently, a transition power in a low frequency range is acquired. In the second sub-step, the transition power is subtracted from the second power. Consequently, the compensated power in the specified frequency range is acquired. The specified frequency range is a high frequency range.

From the above descriptions, the present invention provides an electric power system and a control method. The electric power system includes an energy storage module. In response to an operational change of an electric/kinetic energy conversion device, a charge/discharge operation of the energy storage module is automatically performed to compensate the operational change of the electric/kinetic energy conversion device and reduce an influence of the operational change of the electric/kinetic energy conversion device on the first power between the first power converter and the power terminal. That is, when the operational change of the electric/kinetic energy conversion device occurs, the voltage at the DC bus and the first power are stabilized. Especially, the operational change of the electric/kinetic energy conversion device can be completely compensated by the charge/discharge operation of the energy storage module. Consequently, the first power is kept stable. When a loading of the electric motor increases, the energy storage module discharges electricity to compensate the change of the desired load power.

In case that the electric power system of the present invention is used in a ship, it is not necessary to increase the output power or additionally equip a backup power generator. Consequently, the thermal power generated by the electric motor is decreased, the fabricating cost is reduced, the DC bus voltage of the variable-frequency drive is stabilized, and the influence of the external factor on the power grid is reduced. When the electric motor is operated in the deceleration stage and in the power generation mode, a charge operation of the energy storage module is performed to reduce the influence of the load change of the inductive load on the first power. Consequently, the size, weight and heat-dissipating efficiency of the bleeder resistor are optimized. Moreover, since the excess electric energy is stored in the energy storage module, the operating efficiency of the electric power system is enhanced. When the power generator of the ship is disabled, the energy storage module can provide electric energy for driving the ship. Consequently, the electric power system of the present invention is environmentally friendly to the ports. When a smooth control is performed on the input power of the power grid or the output power of the power generator, it is not necessary to detect the voltage signal or current signal of the power grid or the power generator. Consequently, the electric power system of the present invention has many benefits. For example, the smooth power output is not influenced by the change of the power grid side or the power generator side. Moreover, for a weak power grid, the smooth control of the input power and the control of the power grid side are not interfered with each other.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An electric power system for converting and transferring electric energy between an electric/kinetic energy conversion device and a power terminal, the electric power system comprising:
   a variable-frequency drive comprising:
   a first power converter connected between a DC bus and the power terminal, wherein electric energy is transferred between the first power converter and the power terminal at a first power;
   a second power converter connected between the DC bus and the electric/kinetic energy conversion device, wherein electric energy is transferred between the second power converter and the electric/kinetic energy conversion device at a second power, wherein the second power is dynamically changed in response to an operational change of the electric/kinetic energy conversion device; and
   at least one energy storage module connected with the DC bus; and
   a control module connected with the variable-frequency drive and the electric/kinetic energy conversion device;

wherein the control module comprises:
a spectral computing unit performing a spectral decomposition on the second power so that a spectral sequence of the second power is acquired;
a filter filtering off the spectral sequence, thereby acquiring a compensated power in a high frequency range;
a current computing unit connected with the filter, wherein according to a battery voltage of the energy storage module and the compensated power, the current computing unit calculates a reference current;
a comparing unit connected with the current computing unit, wherein by comparing the reference current with a real current of the energy storage module, the comparing unit outputs a comparing result; and
an adjusting unit connected with the comparing unit, wherein according to the comparing result, the adjusting unit controls operations of the energy storage module and adjusts the real current of the energy storage module.

2. The electric power system according to claim 1, wherein the energy storage module comprises a charge/discharge circuit and an energy storage element, wherein the charge/discharge circuit is connected with the energy storage element and the control module, and the control module controls the charge/discharge circuit to selectively charge electric energy into the energy storage element or discharge electric energy from the energy storage element.

3. The electric power system according to claim 2, wherein the spectral computing unit is connected with the variable-frequency drive, wherein according to plural parameters of the variable-frequency drive, the spectral computing unit calculates the second power between the second power converter and the electric/kinetic energy conversion device, and the filter which is a high pass filter is connected with the spectral computing unit for filtering off a low frequency component of the spectral sequence, thereby acquiring the compensated power in the high frequency range.

4. The electric power system according to claim 2, wherein the at least one energy storage module comprises a first energy storage module and a second energy storage module, and an energy storage element of the first energy storage module and an energy storage element of the second energy storage module have different characteristics.

5. The electric power system according to claim 4, wherein the control module comprises an energy storage controller, and the energy storage controller comprises:
a spectral computing unit connected with the variable-frequency drive, wherein according to plural parameters of the variable-frequency drive, the spectral computing unit calculates the second power between the second power converter and the electric/kinetic energy conversion device, wherein after the spectral computing unit performs a spectral decomposition on the second power, a spectral sequence of the second power is acquired;
a first high pass filter connected with the spectral computing unit for filtering off a first low frequency component of the spectral sequence, thereby acquiring a first compensated power in a first high frequency range;
a second high pass filter connected with the spectral computing unit for filtering off a second low frequency component of the spectral sequence, thereby acquiring a second compensated power in a second high frequency range, wherein a bandwidth of the first high pass filter and a bandwidth of the second high pass filter are different, and the first high frequency range of the first compensated power and the second high frequency range of the second compensated power are different;
a differential comparator, wherein a non-inverted input terminal of the differential comparator is connected with the second high pass filter, and an inverted input terminal of the differential comparator is connected with the first high pass filter, wherein by comparing the first compensated power with the second compensated power, the differential comparator outputs a differential power;
a first current computing unit connected with the first high pass filter, wherein according to a first battery voltage of the energy storage element of the first energy storage module and the first compensated power, the first current computing unit calculates a first reference current;
a second current computing unit connected with the differential comparator, wherein according to a second battery voltage of the energy storage element of the second energy storage module and the differential power, the second current computing unit calculates a second reference current;
a first comparing unit connected with the first current computing unit, wherein by comparing the first reference current with a first real current of the energy storage element of the first energy storage module, the first comparing unit outputs a first comparing result;
a second comparing unit connected with the second current computing unit, wherein by comparing the second reference current with a second real current of the energy storage element of the second energy storage module, the second comparing unit outputs a second comparing result;
a first adjusting unit connected with the first comparing unit, wherein according to the first comparing result, the first adjusting unit controls operations of the first energy storage module and adjusts the first real current of the energy storage element of the first energy storage module; and
a second adjusting unit connected with the second comparing unit, wherein according to the second comparing result, the second adjusting unit controls operations of the second energy storage module and adjusts the second real current of the energy storage element of the second energy storage module.

6. The electric power system according to claim 2, wherein the spectral computing unit is connected with the variable-frequency drive, wherein according to plural parameters of the variable-frequency drive, the spectral computing unit calculates the second power between the second power converter and the electric/kinetic energy conversion device, and the filter comprises a low pass filter and a subtractor, wherein the low pass filter is connected with the spectral computing unit for filtering off a high frequency component of the spectral sequence, thereby acquiring a transition power in a low frequency range, and the subtractor is connected with the low pass filter, wherein after the transition power is subtracted from the second power by the subtractor, the compensated power in the high frequency range is acquired.

7. The electric power system according to claim 1, wherein the electric power system is installed on a ship, the electric/kinetic energy conversion device is an inductive load, and the power terminal is a power generator, wherein the first power is an input power provided by the power generator, and the first power converter is a rectifier circuit for rectifying an AC input energy corresponding to the input power and outputting a DC energy to the DC bus, wherein the second power is an output power from the variable-frequency drive, and the second power converter is an inverter circuit for converting the DC energy into an AC output energy corresponding to the second power and outputting the AC output energy to the inductive load.

8. The electric power system according to claim 7, wherein the power generator is a three-phase AC power generator, and the electric power system further comprises a distribution board, wherein the distribution board is connected between the rectifier circuit and the variable-frequency drive, and electric energy from the power generator is distributed by the distribution board.

9. The electric power system according to claim 7, wherein the second power is acquired according to plural parameters of the variable-frequency drive, wherein the plural parameters contain an output current and an output voltage that are outputted from the variable-frequency drive.

10. The electric power system according to claim 7, wherein when the inductive load is operated in an electric motor mode and a load power of the inductive load is lower than the input power, the electric energy from the power generator charges the energy storage module under control of the control module.

11. The electric power system according to claim 7, wherein when the inductive load is operated in an electric motor mode and a load power of the inductive load is higher than the input power in response to a dynamic change of the inductive load, the control module controls the energy storage module to discharge electricity to compensate a difference between the load power and the input power.

12. The electric power system according to claim 7, wherein when the inductive load is operated in a power generation mode, the electric energy from the inductive load is released to the DC bus to charge the energy storage module under control of the control module.

13. The electric power system according to claim 7, wherein when the power generator is disabled, the control module controls the energy storage module to discharge electricity, and a load power of the inductive load is completely provided by the energy storage module.

14. The electric power system according to claim 1, wherein the electric power system is installed in a photovoltaic power generation apparatus, the electric/kinetic energy conversion device is a photovoltaic power generator, and the power terminal is a power grid, wherein the second power is an input power provided by the photovoltaic power generator, and the second power converter is a DC/DC converter for transforming a DC input energy corresponding to the input power and outputting a transition DC energy, wherein the first power is an output power from the variable-frequency drive, and the first power converter is an inverter circuit for converting the transition DC energy into an AC output energy corresponding to the first power, so that the AC output energy corresponding to the first power is transmitted to the power grid.

15. The electric power system according to claim 1, wherein the electric power system is installed in a wind power generation apparatus, the electric/kinetic energy conversion device is a wind power generator, and the power terminal is a power grid, wherein the second power is an input power provided by the wind power generator, and the second power converter is a rectifier circuit for rectifying an AC input energy corresponding to the input power and outputting a transition DC energy, wherein the first power is an output power from the variable-frequency drive, and the first power converter is an inverter circuit for converting the transition DC energy into an AC output energy corresponding to the first power, so that the AC output energy corresponding to the first power is transmitted to the power grid.

16. The electric power system according to claim 15, wherein the second power is acquired according to plural parameters of the variable-frequency drive, wherein the plural parameters contain an input current and an input voltage that are inputted from the wind power generator to the variable-frequency drive.

17. A control method of an electric power system, the electric power system being connected between an electric/kinetic energy conversion device and a power terminal, the electric power system comprising a variable-frequency drive and a control module, the control module controlling a charge/discharge operation of an energy storage module of the variable-frequency drive, electric energy being transferred between the electric power system and the power terminal at a first power, electric energy being transferred between the electric power system and the electric/kinetic energy conversion device at a second power, the second power being dynamically changed in response to an operational change of the electric/kinetic energy conversion device, the control method comprising steps of:
(a) calculating the second power according to plural parameters of the variable-frequency drive, and performing a spectral decomposition on the second power to acquire a spectral sequence of the second power;
(b) filtering the spectral sequence to acquire a compensated power in a specified frequency range; and
(c) the control module using the compensated power to control a charge/discharge operation of the energy storage module according to a dynamic change of the second power, thereby compensating the operational change of the electric/kinetic energy conversion device and reducing an influence of the operational change of the electric/kinetic energy conversion device on the first power.

18. The control method according to claim 17, wherein the step (c) further comprises sub-steps of:
(c1) calculating a reference current according to a battery voltage of a energy storage element of the energy storage module and the compensated power;
(c2) comparing the reference current with a real current of the energy storage element, thereby outputting a comparing result; and
(c3) the control module controlling operations of the energy storage module and adjusting the real current of the energy storage element according to the comparing result, so that the operational change of the electric/kinetic energy conversion device is reversely compensated by the energy storage module.

19. The control method according to claim 17, wherein in the step (b), a low frequency component of the spectral sequence is filtered off, so that the compensated power in the specified frequency range is acquired, wherein the specified frequency range is a high frequency range.

20. The control method according to claim 17, wherein the step (b) further comprises sub-steps of:
(b1) filtering off a high frequency component of the spectral sequence, so that a transition power in a low frequency range is acquired; and
(b2) subtracting the transition power from the second power, so that the compensated power in the specified frequency range is acquired, wherein the specified frequency range is a high frequency range.

21. The control method according to claim 17, wherein the control module controls a charge/discharge operation of the energy storage module according to the operational change of the electric/kinetic energy conversion device, so that a smooth control of the first power is realized.

* * * * *